United States Patent [19]

Ikawa

[11] Patent Number: 4,829,474
[45] Date of Patent: May 9, 1989

[54] METHOD AND APPARATUS FOR AUTOMATICALLY RECOGNIZING TAB POSITION

[75] Inventor: Koji Ikawa, Hatano, Japan
[73] Assignee: Ricoh Company, Limited, Tokyo, Japan
[21] Appl. No.: 48,670
[22] Filed: May 11, 1987
[30] Foreign Application Priority Data
May 15, 1986 [JP] Japan ................................ 61-111895
[51] Int. Cl.$^4$ ............................ G06F 1/00; B41J 25/00
[52] U.S. Cl. ..................................... 364/900; 400/279
[58] Field of Search ......................... 364/900; 400/279
[56] References Cited
U.S. PATENT DOCUMENTS

| | | | |
|---|---|---|---|
| 4,149,619 | 4/1979 | Kashio | 400/279 |
| 4,564,304 | 1/1986 | Ueno | 400/279 |
| 4,679,952 | 7/1987 | Hirota et al. | 400/279 |

FOREIGN PATENT DOCUMENTS 54-35131 10/1979 Japan .
55-13061 4/1980 Japan .

Primary Examiner—Raulfe B. Zache
Attorney, Agent, or Firm—Cooper & Dunham

[57] ABSTRACT

Method and apparatus for automatically recognizing tab position requires no manual setting of the tab position. One or a plurality of tab positions are automatically recognized based on a tab information of an immediately preceding line, a tab information of a nearest preceding line which has the tab information, or tab information of all preceding lines which have the tab information. A cursor is moved to a tab position which is in alignment with a tab position of the immediately preceding line, the nearest preceding line, or one of the preceding lines by simply manipulating a tab key.

18 Claims, 21 Drawing Sheets

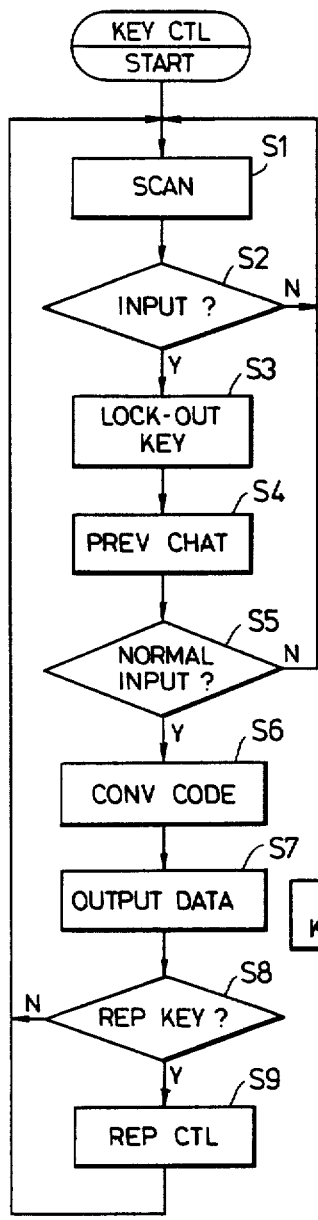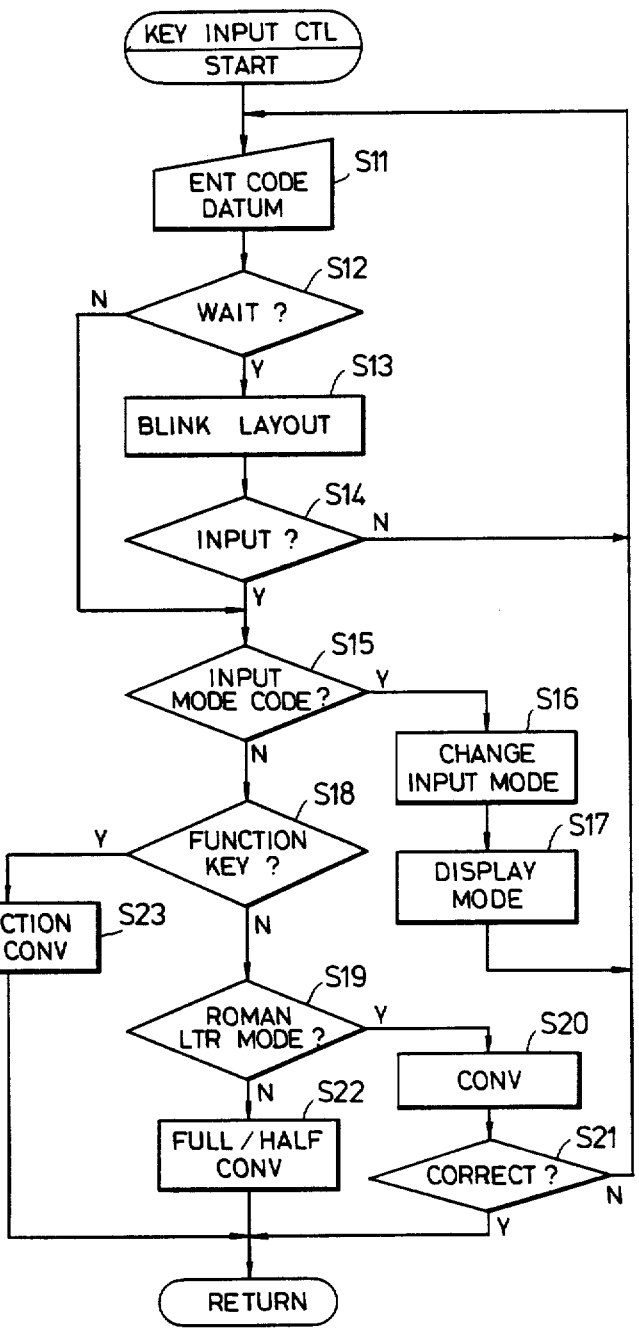

FIG.9A
HIRAGANA INPUT MODE

↓ PUSH KEY 34

ALPHA-NUMERIC
INPUT MODE

↓ PUSH KEY 32

HIRAGANA INPUT MODE
(KANA MODE)

↓ PUSH KEY 35

HIRAGANA INPUT MODE
(ROMAN LETTER INPUT MODE)

↓ PUSH KEY 34

ALPHA-NUMERIC
INPUT MODE

↓ PUSH KEY 32

HIRAGANA INPUT MODE
(ROMAN LETTER INPUT MODE)

↓ PUSH KEY 33

KATAKANA INPUT MODE
(ROMAN LETTER INPUT MODE)

FIG.9B
HIRAGANA

ALPHA NUMERIC

HIRAGANA

[HIRAGANA] [    ]

ALPHA NUMERIC

[HIRAGANA] [    ]

[KATAKANA] [    ]

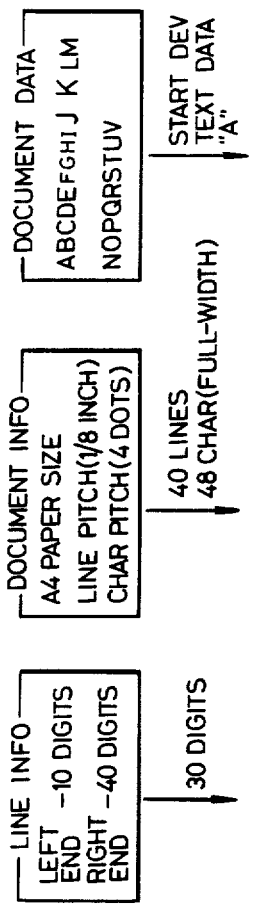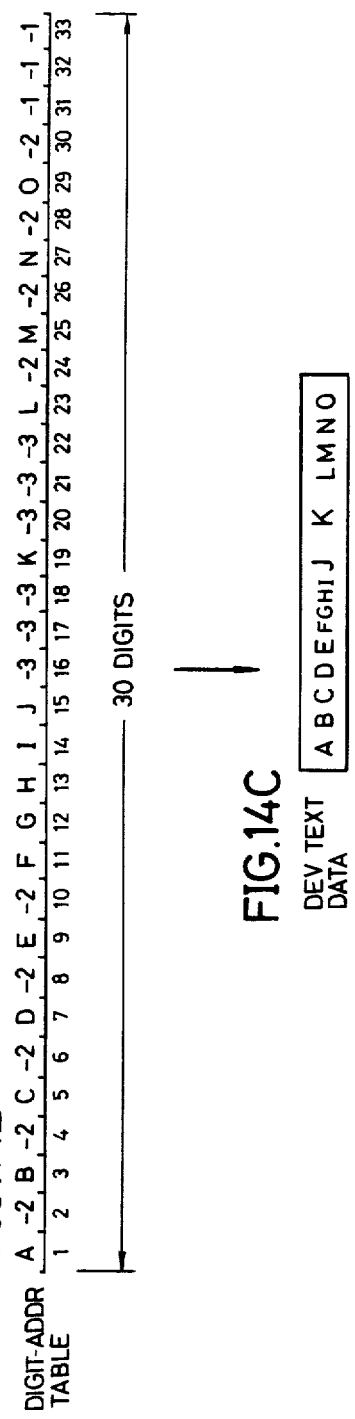

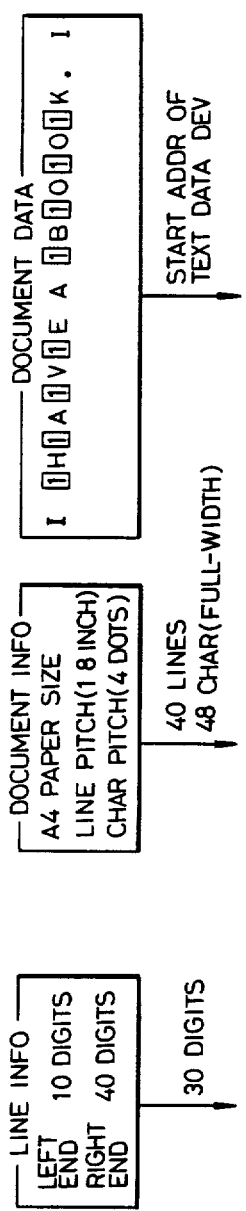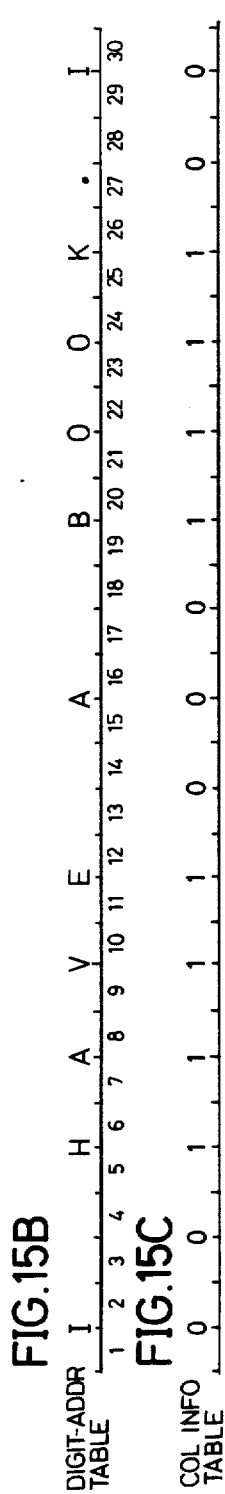

DIGIT-ADDR
TABLE

COL INFO
TABLE

FIG. 22A

DIGIT-ADDR TABLE

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|
| ☐ | ☐ | ☐ | ☐ | ☐ | ☐ | ☐ | ☐ | A | 1 | | | ☐ | ☐ | ☐ | ☐ | S | U | M | M | A | R | Y | ↻ | | | | | | | | |

FIG. 22B

TAB INFO TABLE

| 0 | 0 | 0 | 0 | 0 | 0 | 0 | 0 | 0 | 1 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |

FIG. 23

LINE 1  ☐☐☐☐☐ ( 1 )  A B ☐☐☐☐ 1 2 3
LINE 2  ☐☐☐☐☐ ( 2 )  C D E ☐☐☐ F G H
LINE 3  ☐☐☐☐☐ ( 3 )  I J K L ☐ M N O

FIG. 25A

```
LINE 1  [ ] [ ] [ ] [ ]  A  B  )
LINE 2   X  X  X  X  X  X  X  X  X  X  X  X  X  )
LINE 3   Y  Y  Y  Y  Y  Y  Y  Y  Y  Y  Y  Y  )
LINE 4   Z  Z  Z  Z  Z  Z  Z  Z  )
LINE 5  [ ] [ ] [ ] [ ]  C  D  )
LINE 6   1  1  1  1  1  1  1  1  1  1  1  1  1  )
LINE 7   2  2  2  2  2  2  2  2  2  2  2  2  2  )
```

FIG. 25B

```
LINE 1   A  B  C  )
LINE 2  [ ] [ ] [ ] [ ]  X  X  X  X  X  X  X  X  X  )
LINE 3  [ ] [ ] [ ] [ ]  Y  Y  Y  Y  Y  Y  Y  Y  )
LINE 4  [ ] [ ] [ ] [ ]  Z  Z  Z  Z  Z  Z  Z  Z  )
LINE 5   D  E  F  )
LINE 6  [ ] [ ] [ ] [ ]  1  1  1  1  1  1  1  1  1  )
LINE 7  [ ] [ ] [ ] [ ]  2  2  2  2  2  2  2  2  )
```

FIG. 27A
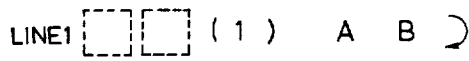
FIG. 27B
FIG. 27C
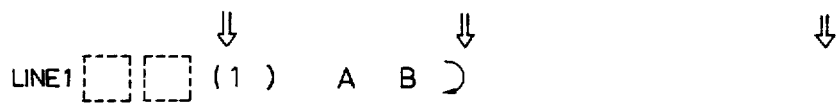
FIG. 27D
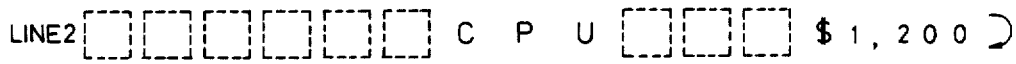
FIG. 27E
FIG. 28
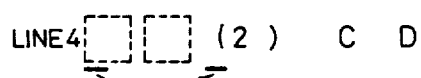
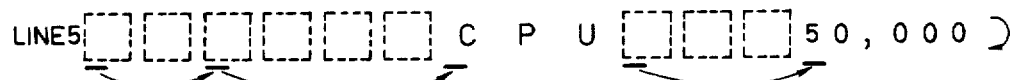
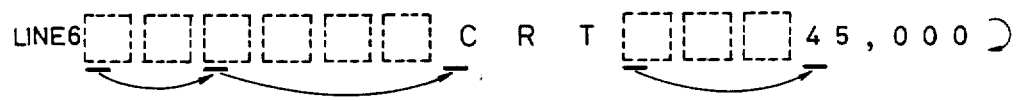

METHOD AND APPARATUS FOR AUTOMATICALLY RECOGNIZING TAB POSITION

BACKGROUND OF THE INVENTION

The present invention generally relates to methods and apparatuses for automatically recognizing tab position, and more particularly to a method and apparatus for automatically recognizing one or more tab positions without the need to manually set the tab positions.

Generally, in information processing apparatuses such as office computers, personal computers, word processors, data processors, work stations and automatic translating apparatuses, a tab function is provided for indenting a starting position of a character or the like by a predetermined number of spaces from a left end of a display area. In the case of the word processor, the tab function is usually used for identifying the beginning of each paragraph and for aligning columns when making a table.

However, in the conventional information processing apparatus, a user must first teach the information processing apparatus where one or a plurality of tab positions are to be set, so that a desired tab position can be reached afterwards when the user manipulates a tab key. In other words, when a tab position is to be set at a position five spaces from the left, for example, the user must move a cursor to this tab position and set this tab position into the information processing apparatus by manipulating a tab set key. When the user is making a document after the set tab position has been set, the cursor will move to the tab position by simply manipulating the tab key.

But the conventional information processing apparatus suffers a problem in that the operation of setting the tab position is troublesome for the user, especially when a plurality of tab positions must be set. Furthermore, the tab positions are not necessarily fixed and the user may wish to use different tab positions for different tasks. In other words, the user may wish to indent by three spaces by the tab in a first document and to indent by five spaces by the tab in a second document. According to the conventional information processing apparatus, there is also a problem in that the user must carry out the operation of setting the tab positions every time the different tab positions are to be used.

SUMMARY OF THE INVENTION

Accordingly, it is a general object of the present invention to provide a novel and useful method and apparatus for automatically recognizing tab position, in which the problems described heretofore are eliminated.

Another and more specific object of the present invention is to provide a method and apparatus for automatically recognizing tab position, in which one or a plurality of tab positions are automatically recognized based on tab information of an immediately preceding line. According to the method and apparatus of the present invention, it is possible to move a cursor to a tab position which is in alignment with a tab position of the immediately preceding line by simply manipulating a tab key, without the need to manually set the one or plurality of tab positions of the immediately preceding line.

Still another object of the present invention is to provide a method and apparatus for automatically recognizing tab position, in which one or a plurality of tab positions are automatically recognized based on tab information of a nearest preceding line which has the tab information. According to the method and apparatus of the present invention, it is possible to move a cursor to a tab position which is in alignment with a tab position of the nearest preceding line by simply manipulating a tab key, without the need to manually set the one or plurality of tab positions of the nearest preceding line.

A further object of the present invention is to provide a method and apparatus for automatically recognizing tab position, in which one or a plurality of tab positions are automatically recognized based on tab information of all of preceding lines of a page. According to the method and apparatus of the present invention, it is possible to move a cursor to a tab position which is in alignment with a tab position of any one of the preceding lines by simply manipulating a tab key, without the need to manually set the one or plurality of tab positions of the preceding lines.

Other objects and further features of the present invention will be apparent from the following detailed description when read in conjunction with the accompanying drawings. The present invention provides a method and an apparatus for automatically recognizing one or a plurality of tab positions based on tab information of a preceding line, without the need to manually set the tab positions.

BRIEF DESCRIPTION OF THE DRAWINGS

FIG. 7 is a flow chart for explaining a keyboard control process;

FIG. 8 is a flow chart for explaining a key input control process;

FIGS. 9A and 9B are diagrams for explaining the key input control process;

FIGS. 14A through 14C and FIGS. 15A through 15D respectively are diagrams for explaining the text developing process;

FIGS. 17A through 17C are diagrams for explaining the line display control process;

FIGS. 22A and 22B and FIG. 23 are diagrams for explaining the first embodiment of the tab skip process;

FIGS. 25A and 25B are diagrams for explaining the second embodiment of the tab skip process;

FIGS. 27A through 27E and 28 are diagrams for explaining the third embodiment of the tab skip process.

DETAILED DESCRIPTION

Figure 1:
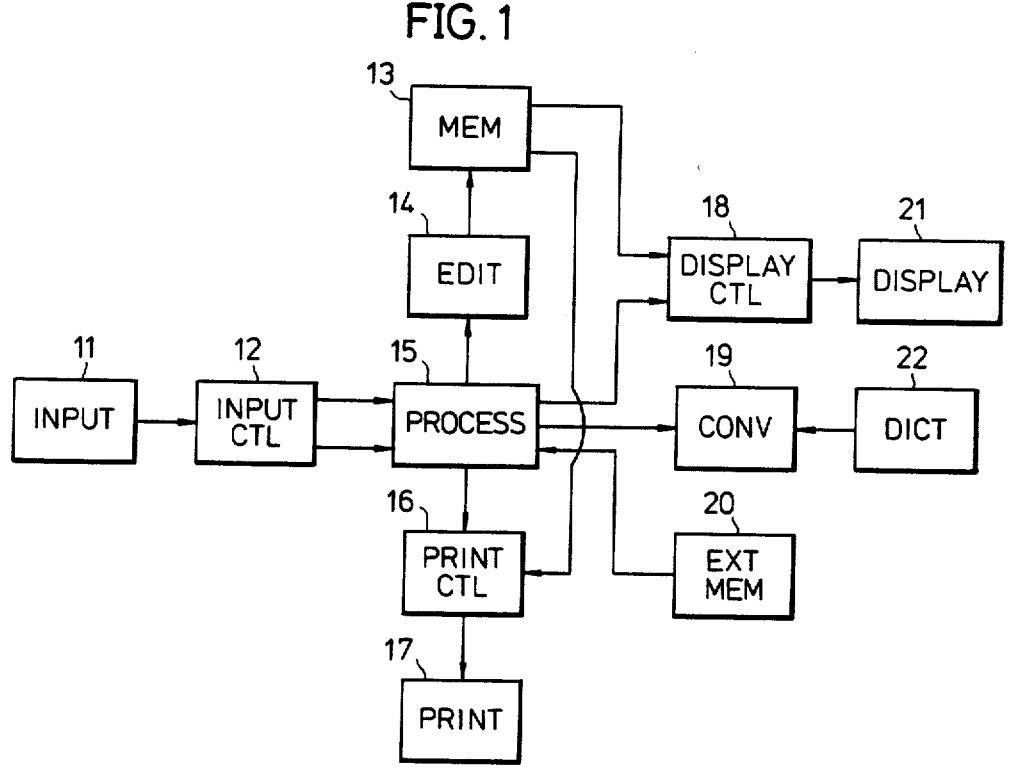
FIG. 1 is a general system block diagram showing an information processing apparatus which may be applied with an embodiment of the method and apparatus for automatically recognizing tab position according to the present invention.

FIG. 1 shows a general system block diagram of an information processing apparatus which may be applied with an embodiment of the method and apparatus for automatically recognizing tab position according to the present invention. The information processing apparatus generally comprises an input part 11, an input control part 12, a memory part 13, an editing part 14, a central processing part 15, a printer control part 16, a printer 17, a display control part 18, a converting part 19 for converting "kana" (Japanese syllabary or alphabet) into Chinese character, an external memory part 20, a display part 21, and a dictionary part 22. The external memory 20 stores document information, character pattern data and the like. The printer 17 prints the document information and the like. The display part 21 displays the document information, layout information and the like.

The input part 11 comprises keys for designating kana, alphabets, numerals, symbols and the like and function keys for designating functions other than the designation of kana, alphabets, numerals, symbols and the like. The input control part 12 scans a key matrix of the input part 11 to enter an input datum and converts the input datum into a corresponding code datum (key datum).

The central processing part 15 controls the information processing apparatus in its entirety. The central processing part 15 carries out a control to store a character datum of a key datum which is obtained from the input control part 12 into the memory 13 via the editing part 14. The central processing part 15 carries out a control to convert an input datum related to kana into a datum related to Chinese character in the converting part 19 responsive to a request from the editing part 14, and the converted input datum is supplied to the editing part 14. The central processing part 15 also carries out a control to enter stored character information, character pattern and the like from the external memory part 20 responsive to a request from the editing part 14. The central processing part 15 also carries out a control to supply display commands to the display control part 18, supply print commands to the printer control part 16 and the like.

The editing part 14 stores the character datum from the central processing part 15 into the memory part 13 as a text datum (document datum). In other words, the memory part 13 is used as a memory for document storage. In addition, the editing part 14 subjects the document datum read out from the memory part 13 to an editing process, and stores the edited document datum into the memory part 13.

The converting part 19 reads out from the dictionary part 22 a word information corresponding to an input character sequence responsive to a conversion request from the central processing part 15, and supplies the read out word information to the central processing part 15 as the converted datum. The dictionary part 22 stores word information, tables for classifying parts of speech and the like.

The display control part 18 reads out the stored text datum (document datum) from the memory part 13 responsive to a display command from the central processing part 15 so as to form a display datum which is supplied to the display part 21. The printer control part 16 reads out the stored text datum (document datum) from the memory part 13 responsive to a print command from the central processing part 15 so as to form a printing datum which is supplied to the printer 17. The display part 21 displays the document information, layout information and the like. The printer 17 prints the document information and the like.

Figure 2:
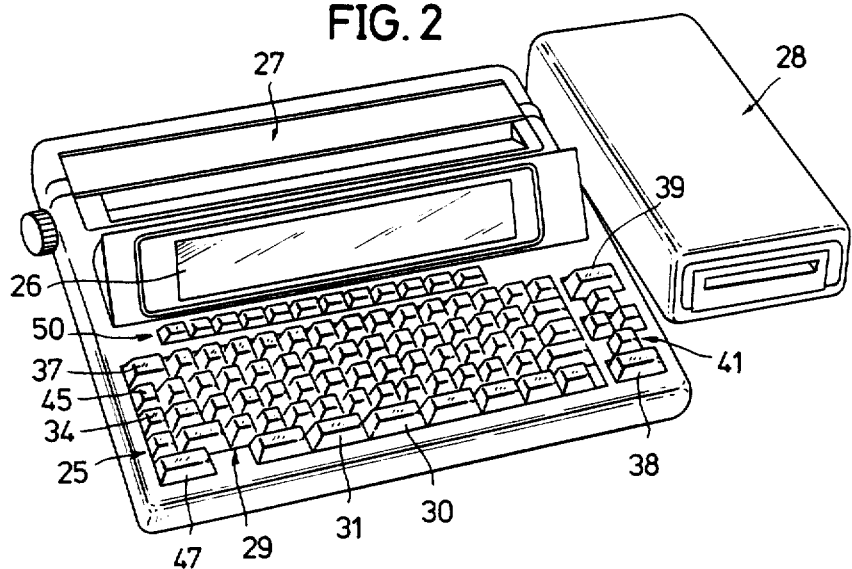
FIG. 2 is a perspective view showing the information processing apparatus.

FIG. 2 shows a perspective view of the information processing apparatus. A keyboard 25 is used as an input device for entering character information and control information. The character information relates to "hiragana" (Japanese cursive syllabary), "katakana" (square Japanese syllabary), alphabet, numerals, symbols and the like. The kana referred to before means either the hiragana or the katakana. The control information is the information required to create a document, edit a document, print a document and the like. A liquid crystal display (LCD) device 26 comprises a display area amounting to a predetermined number of lines for displaying the document and the like. This LCD device 26 corresponds to the display part 20 shown in FIG. 1.

A thermal printer 27 for printing the document and the like corresponds to the printer 17 shown in FIG. 1. A floppy disc drive (FDD) 28 is used as an external device coupled to the information processing apparatus. The FDD 28 stores and retrieves the document, character pattern and the like on and from a floppy disc (not shown), and corresponds to the external memory part 20 shown in FIG. 1.

Figure 3:
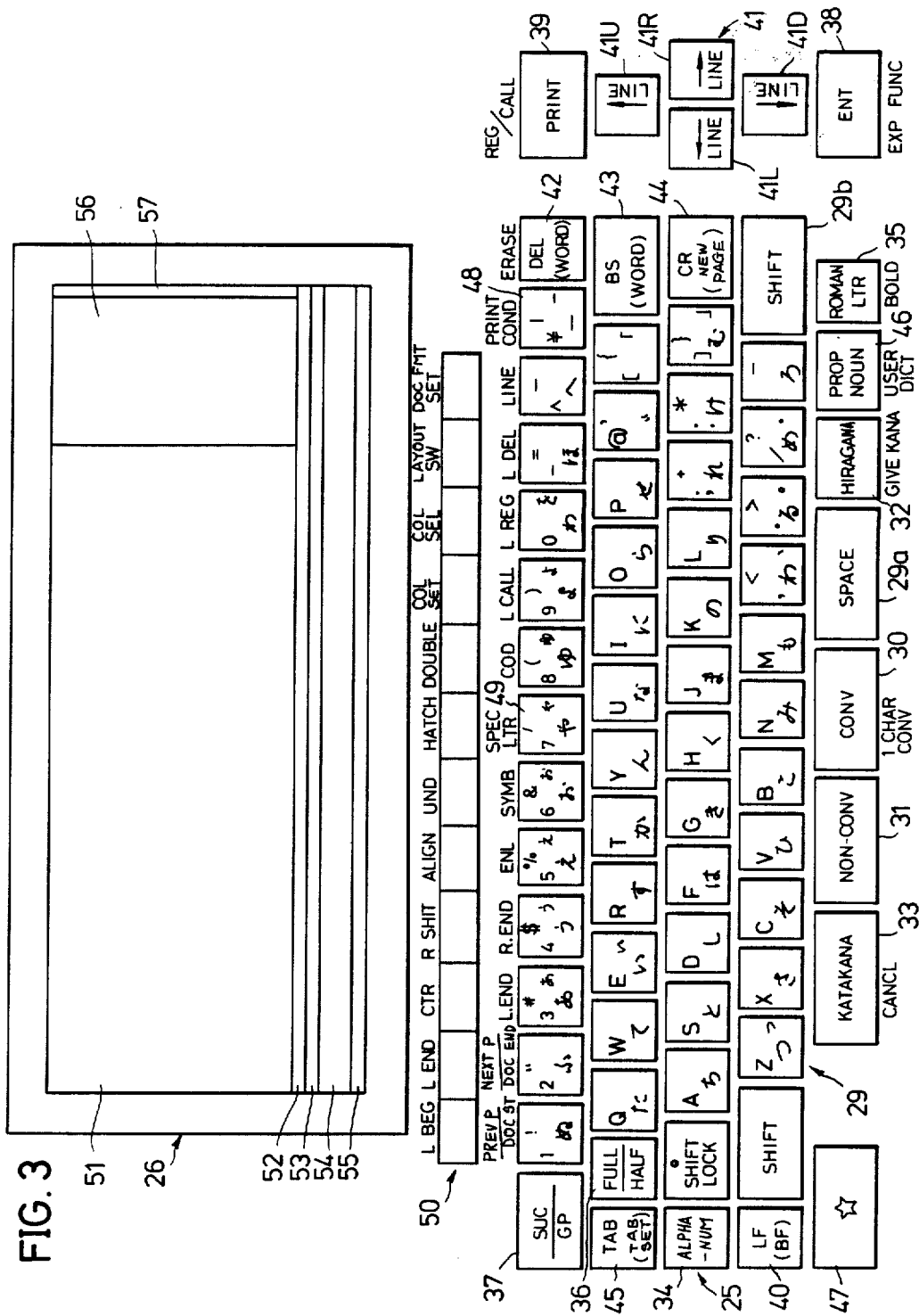
FIG. 3 is a plan view showing a keyboard portion and a display portion of the information processing apparatus.

As shown in FIG. 3, the keyboard 25 comprises various keys. A character key group 29 comprises a plurality of keys for designating characters (kana and alphabet) including a space key 29a and a shift key 29b. A conversion key 30 is used to instruct a conversion of the entered kana into the Chinese character, and to request a next candidate for the Chinese character. A non-conversion key 31 is used to instruct non-conversion of the entered character.

In Japanese, any word may be spelled out by the kana, and some words may also be spelled out in one or more Chinese characters or by a combination of Chinese character and kana. However, there are many words which have the same pronunciation but have different meanings. In such cases, different Chinese characters are used to spell out the words which have the same pronunciation but have the different meanings. Accordingly, when the conversion key 30 is pushed to instruct a conversion of a word spelled out by the kana into the same word spelled out by the Chinese character, there may be more than one candidate for the Chinese character, and in this case, the user may request candidates by pushing the conversion key 30 so as to obtain the Chinese character having the intended meaning.

A hiragana key 32 instructs a hiragana mode in which the characters entered from the character key group 29 are to be taken as hiragana. Similarly, a katakana key 33 instructs a katakana mode in which the characters entered from the character key group 29 are to be taken as katakana. In addition, an alpha-numeric key 34 instructs an alpha-numeric mode in which the characters entered from the character key group 29 are to be taken as alphabets in small letters or numerals. A Roman letter key 35 instructs a Roman letter mode in which the characters entered from the character key group 29 are to be taken as alphabets (Roman letters) in capital letters. A full/half width key 36 instructs either a full-width mode in which the character is displayed (and printed) using the full width of a display area which may be allocated for one character, or a half-width mode in which the character is displayed (and printed) using one-half the width of the display area allocated for one character.

A successive/group key 37 instructs whether the conversion instructed by the conversion key 30 is to be carried out in a successive conversion mode in which the entered characters are successively converted or in a group conversion mode in which the entered characters are converted for every predetermined number of characters, that is, for every group of characters.

An enter key 38 instructs the execution of various processings, a print key 39 instructs a print out, and a line feed key 40 instructs a line feed of the printer 27. A cursor key group 41 comprises cursor keys 41R, 41L, 41U and 41D for respectively instructing a cursor to move right, left, up and down on a display of the LCD device 26. A delete key 42 instructs a deletion of one character, a back space key 43 instructs a back space with deletion of one character, and a cursor return key 44 instructs the cursor to return to a starting position of a new line. A tab key 45 instructs a tab, and a proper noun key 46 instructs that the entered characters spell out a proper noun.

A function select key 47 instructs a function indicated above or below a key (or indicated on the key top in brackets) when pushed simultaneously therewith. In other words, when the function select key 47 is pushed simultaneously as the conversion key 30, for example, a conversion of a single Chinese character is instructed. The simultaneous pushing of the function select key 47 and the print key 39 instructs registration or calling of a document. The simultaneous pushing of the function select key 47 and one of the cursor keys 41R, 41L, 41U and 41D instructs a setting of a ruled line in the respective directions. The simultaneous pushing of the function select key 47 and the tab key 45 instructs a manual setting of a tab. The simultaneous pushing of the function select key 47 and a key 48 for the character "Y" instructs a setting of a printing condition, and the simultaneous pushing of the function select key 47 and a key 49 for the numeral "7" instructs a read-out of a pre-stored special character or pattern which may be accessed by entering a predetermined code from the keyboard 25. Other functions are realized by the simultaneous pushing of the function select key 47 and a predetermined key, but description thereof will be omitted because these functions are not directly related to the subject matter of the present invention.

A function key group 50 comprises keys for instructing various functions to set the document format, switch a layout display, select the color of the character to be displayed, set the color property of the character, set a width of a character to double the full width of the display area originally allocated for one character, set a shaded area with hatching or cross-hatching on a predetermined display area, set an underline, align right and left ends of the line, shift line or document to the right side, make a centering, set a line ending, and set a line beginning.

The display area of the LCD device 26 is divided into a plurality of display sections shown in FIG. 3, and each display section of the display area is used exclusively for the display of a certain information. An editing display section 51 is used for displaying the entered character sequence, Chinese characters after the conversion is made, ruled lines and the like. An end and tab position display section 52 is used for displaying the right and left end positions (margins) and the tab positions which are manually set. A scale display section 53 is used for displaying the number of digits, the number of characters or the like. A guidance display section 54 is used for displaying a guidance information such as the candidates for Chinese characters when carrying out the conversion in the successive or group conversion mode, the input mode, the present position of the cursor (page, line, digit), paper size, maximum number of characters, maximum number of lines, half-width or full-width mode, the color property of the character at the cursor position, printing condition (printing mode, vertical or horizontal writing sequence, ruled line, etc.) and the like. A state display section 55 is used for displaying a state information indicative of the state of the information processing apparatus.

A layout display section 56 is used for displaying the layout of one page of the document which is presently being created or edited, and for displaying a special character or pattern which is to be created and stored. A layout type display section 57 is used for displaying the type of layout which is displayed on the layout display section 56.

Figure 4:
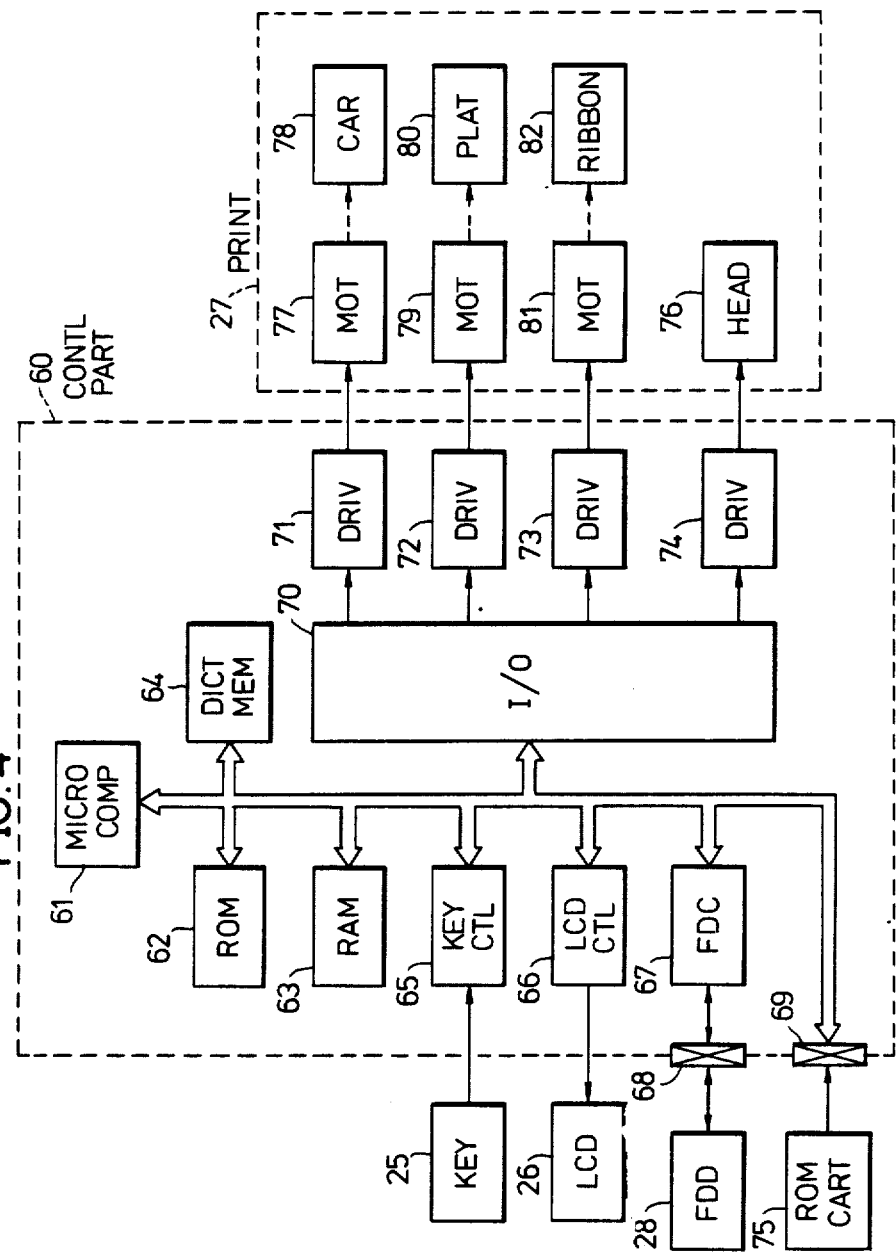
FIGS. 4, 5 and 6 are system block diagrams respectively showing embodiments of parts of the block system shown in FIG. 1.

FIG. 4 shows an embodiment of a control part of the information processing apparatus together with peripheral parts such as the keyboard 25. In FIG. 4, a control part 60 comprises a microcomputer 61, a read only memory (ROM) 62, a random access memory (RAM) 63, a dictionary memory 64, a keyboard controller 65, an LCD controller 66, a floppy disc controller (FDC) 67, connectors 68 and 69, an input/output device 70, and drivers 71 through 74. The control part 60 controls the information processing apparatus in its entirety including the control of the conversion from kana to Chinese character, creating and editing of documents, printing, character enlarging and the like.

The ROM 62 stores various fixed information such as control programs which are necessary to carry out the various operations of the information processing apparatus, standard document formats (paper size, paper inserting direction, character pitch, line pitch, etc.) and the like.

The RAM 63 is used as a data storage area for storing various data and a working area for executing programs. The data storage area comprises a code data storage area (input buffer area) for storing the code datum entered from the keyboard 25, a document data storage area for storing the document datum, a storage area for storing the set document information and line information including the right and left end information (margin), set mode information and the like.

The dictionary memory 64 comprises a dictionary storage area which stores a dictionary (word dictionary, tables for classifying parts of speech, etc.), a character pattern storage area which stores predetermined character style (Gothic, for example) and character pattern, a mark pattern storage area which stores patterns of color discrimination marks which indicate the color property of the character and the like.

The keyboard controller 65 discriminates the kind of input datum from the keyboard 25, and transfers a control datum for turning ON a light emitting diode (LED, not shown) of a pushed key. The LCD controller 66 has an internal video memory (video RAM or VRAM) and the like and controls the display on the LCD device 26.

Since the FDD 28 described before may be coupled to the control part 60 via the connector 68, the FDC 67 is provided to control the write-in and read-out of information to and from the floppy disc in the FDD 28. For example, the floppy disc loaded into the FDD 28 stores documents and character patterns in conformance with the second level character set by the Japanese Industrial Standards.

A ROM cartridge 75 may be coupled to the control part 60 via the connector 69, as an external memory device which stores character patterns. The microcomputer 61 controls the read-out of the character pattern from the ROM cartridge 75. For example, the ROM cartridge 75 stores the character patterns in conformance with the second level character set by the Japanese Industrial Standards.

In the present specification, the character pattern storage area of the dictionary memory 64, the character pattern storage area of the floppy disc in the FDD 28, and the ROM cartridge 75 will generally be referred to as a character generator.

The microcomputer 61 controls the printer 27 by outputting via the driver 74 a head driving datum in accordance with the printing character from the input-/output device 70. The head driving datum from the driver 74 is supplied to a printing head (thermal head) 76 of the printer 27, and heating elements (not shown) of the printing head 76 are controlled and driven so as to print a character.

The microcomputer 61 outputs a space driving datum via the input/output device 70 and the driver 71. The space driving datum is supplied to a space motor 77 of the printer 27 so as to control the rotation of the space motor 77, and a carriage 78 of the printer 27 is transported by the space motor 77. The microcomputer 61 also outputs a line feed driving datum via the input/output device 70 and the driver 72. The line feed driving datum is supplied to a line feed motor 79 of the printer 27 so as to control the rotation of the line feed motor 79, and a platen 80 of the printer 27 is fed by the line feed motor 79. Further, the microcomputer 61 outputs a ribbon feed driving datum via the input/output device 70 and the driver 73. The ribbon feed driving datum is supplied to a ribbon feed motor 81 of the printer 27 so as to control the rotation of the ribbon feed motor 81, and a ribbon 82 of the printer 27 is fed by the ribbon feed motor 81.

In the present embodiment, the printer 27 is a color printer. The ribbon 82 sequentially has a cyan portion, a yellow portion and a magenta portion, and this sequence of three colors is repeated along a longitudinal direction of the ribbon 82. Hence, a character may be printed with a desired color by using at least one of the three color portions of the ribbon 82.

In FIG. 4, the FDD 28 and the ROM cartridge 75 correspond to the external memory 20 shown in FIG. 1. The printer 27 corresponds to the printing part 17 shown in FIG. 1. The control part 60 corresponds to the input control part 12, the memory part 13, the editing part 14, the central processing part 15, the printer control part 16, the display control part 18, the converting part 19 and the dictionary part 22 shown in FIG. 1.

Figure 5:
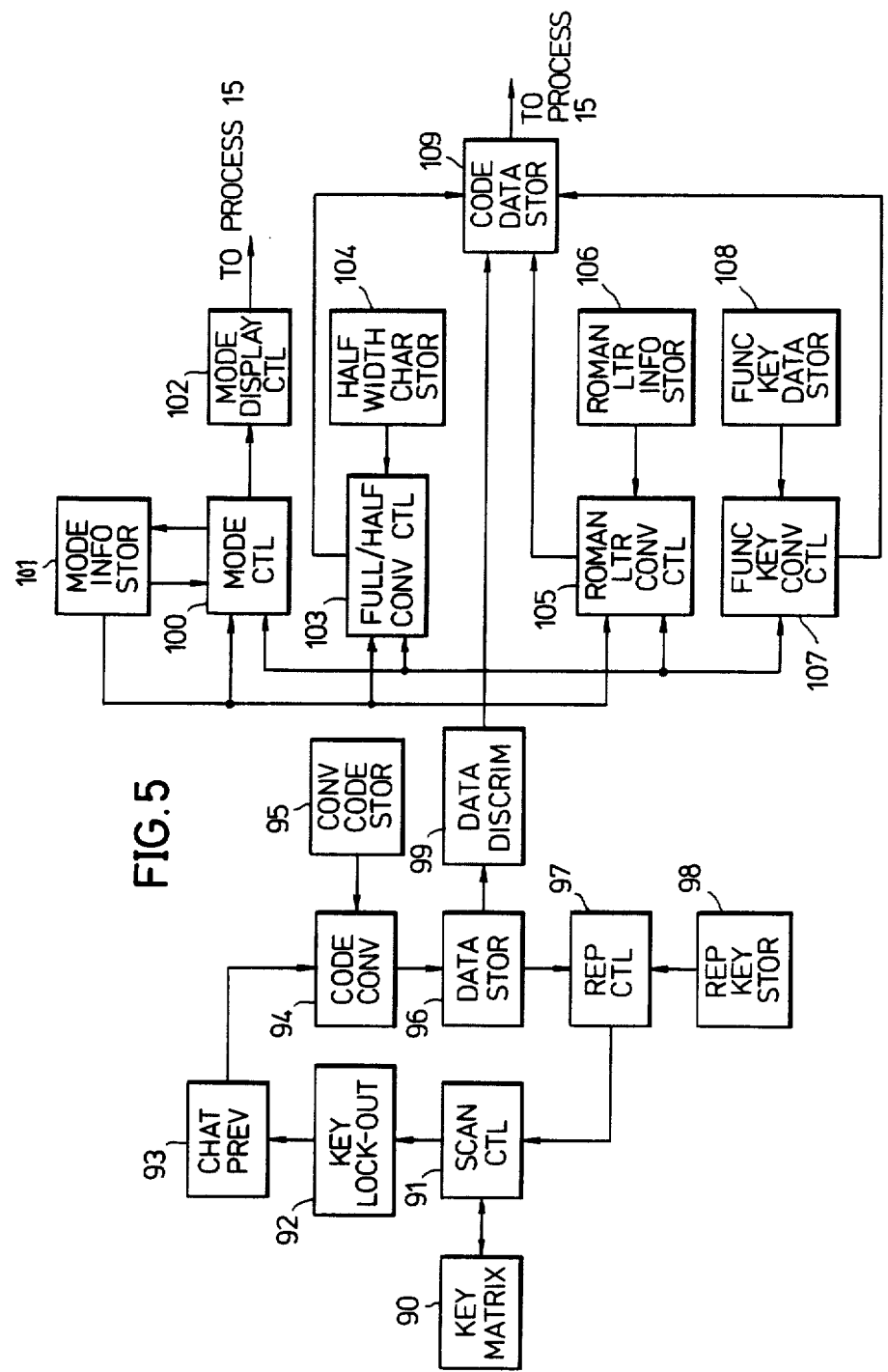

FIG. 5 shows an embodiment of the input part 11 and the input control part 12 shown in FIG. 1. In FIG. 5, the input part 12 comprises a key matrix 90, a scan control part 91, a key lock-out part 92, a chattering preventing part 93, a code converting part 94, a converting code storage area 95, an input data storage area 96, a repeat control part 97, a repeatable key storage area 98, and an input data discriminating part 99.

On the other hand, the input control part 12 comprises an input mode control part 100, an input mode information storage area 101, an input mode display control part 102, a full/half width conversion control part 103, half-width character information storage area 104, a Roman letter conversion control part 105, a Roman letter information storage part 106, a function key conversion control part 107, a function key data storage area 108, and a code data storage area 109.

The scan control part 91 scans the key matrix 90 and supplies to the key lock-out part 92 a key datum of a certain pushed key. The key lock-out part 92 carries out a control so that key data from other keys are locked out (that is, blocked) in case other keys are pushed while the certain key is pushed, and only the key datum of the intended certain key is supplied to the chattering preventing part 93. The chattering preventing part 93 eliminates the chattering of the received key datum, and supplies the key datum to the code converting part 94 when the key datum is obtained properly as a result of eliminating the chattering.

The code converting part 94 reads out from the converting code storage area 95 a code datum in accordance with the received key datum. The cod datum read out from the converting code storage area 95 is supplied to the input data storage area 96.

The repeat control part 97 reads out the code datum stored in the input data storage area 96, and discriminates whether or not the code datum is related to a repeatable key which is stored in the repeatable key storage area 98. A repeatable key is a key which may be kept pushed while the user wishes to enter the same key information repeatedly. When the discrimination result in the repeat control part 97 is in the affirmative, the repeat control part 97 supplies a scan command to the scan control part 91.

The input data discriminating part 99 reads out the input datum (code datum) stored in the input data storage area 96 and discriminates the kind of input datum. The input datum is supplied to various parts of the input control part 12 depending on the discrimination result in the input data discriminating part 99.

The input mode control part 100 of the input control part 12 enters a mode information of the input datum obtained from the input data discriminating part 99. The input mode control part 00 sets an input mode based on this mode information and a present mode information stored in the input mode information storage area 101. A mode information indicative of the set input mode is supplied to the input mode display control part 102 and is also stored in the input mode information storage area 101. The input mode display control part 102 produces a mode display datum in accordance with the mode information from the input mode control part 100, and this mode display datum is supplied to the central processing part 15 shown in FIG. 1.

The full/half width conversion control part 103 enters the input datum (character datum) from the input data discriminating part 99, and discriminates whether or not the half-width mode is instructed by reading out the present mode information stored in the input mode information storage area 101. When it is discriminated that the half-width mode is instructed, the full/half width conversion control part 103 reads out from the half-width character information storage area 104 a half-width character information corresponding to the input datum, and outputs a code datum of the read out half-width character information. The code datum from the full/half width conversion control part 103 is supplied to the code data storage area 109.

The Roman letter conversion control part 105 enters the input datum (character datum) from the input data discriminating part 99, and discriminates whether or not the Roman letter mode is instructed by reading out the present mode information stored in the input mode information storage area 101. When it is discriminated that the Roman letter mode is instructed, the Roman letter conversion control part 105 reads out from the Roman letter information storage area 106 a Roman letter information corresponding to the input datum, and outputs a code datum of the read out Roman letter information. The code datum from the Roman letter conversion control part 105 is supplied to the code data storage area 109.

The function key conversion control part 107 enters the input datum from the input data discriminating part 99 and reads out from the function key data storage area 108 a function key datum corresponding to the input datum. The function key conversion control part 107 outputs a function key code of the read out function key datum, and this function key code is supplied to the code data storage area 109.

The code data storage area 109 stores the input datum obtained from the input data discriminating part 99, the code datum of the half-width character obtained from the full/half width conversion control part 103, the code datum of the Roman letter obtained from the Roman letter conversion control part 105, and the function key code obtained from the function key conversion control part 107. The key datum from the code data storage area 109 is supplied to the central processing part 15 shown in FIG. 1.

Figure 6:
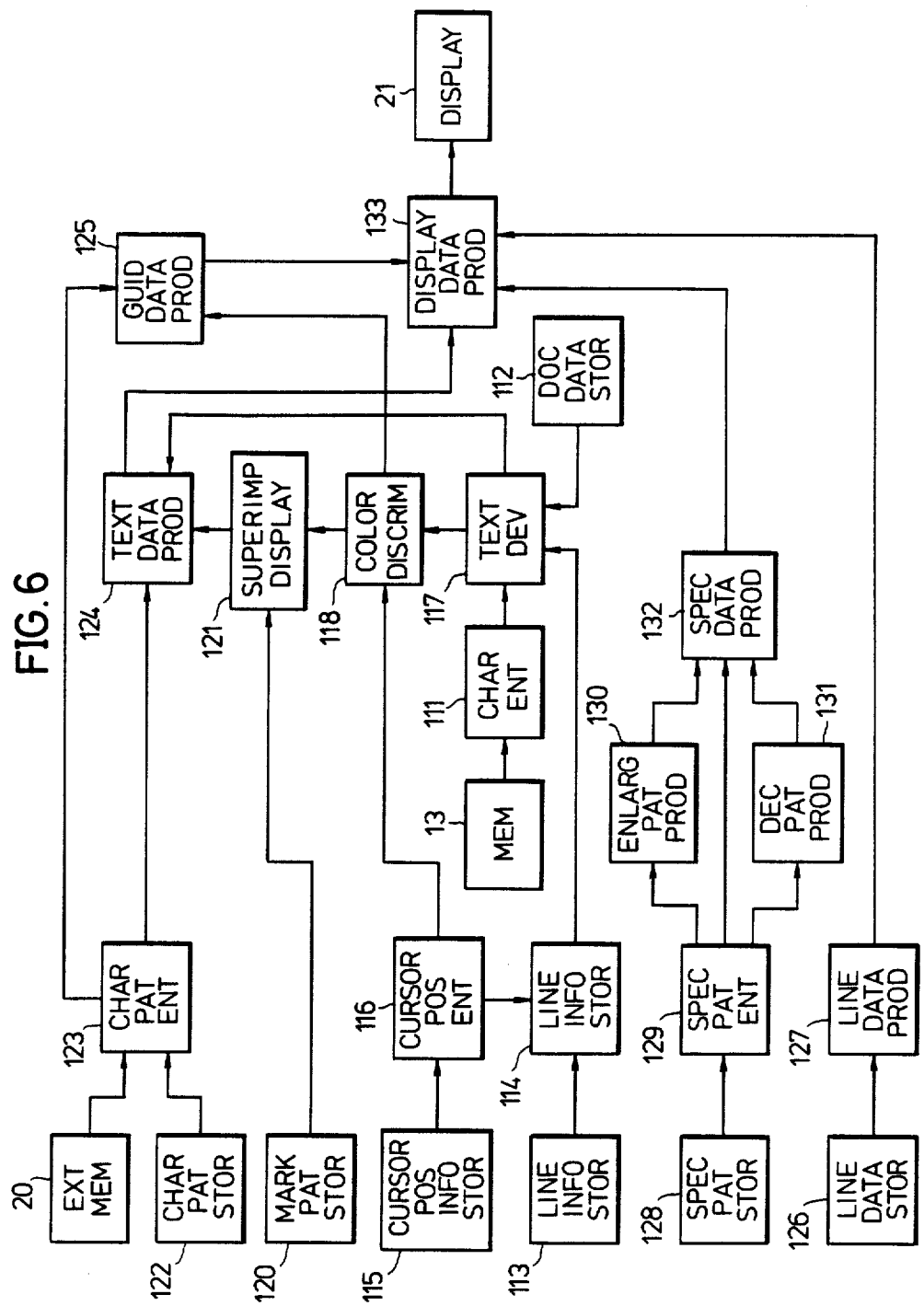

FIG. 6 shows an embodiment of the display control part 18 shown in FIG. 1 together with the memory part 13, the external memory part 20 and the display part 21. In FIG. 6, a character entering part 111 enters one character from the document datum (text datum) stored in the memory part 13, and outputs the character as a character information. A document data storage area 112 stores a document format information of the document, such as the paper size, the character pitch and the line pitch. A line information storage area 113 stores a line information for all of the lines of the document, such as the right and left end information (margin) on each line. A line information entering part 114 enters from the line information storage area 113 a line information of a line which is indicated by a cursor position information obtained from a present cursor position entering part 116 which will be described later.

A cursor position information storage area 115 stores a cursor position information indicative of the present cursor position on the display part 21. The present cursor position entering part 116 enters the cursor position information from the cursor position information storage area 115 and outputs the cursor position information and the line and digit information.

A text developing part 117 enters the character information from the character entering part 111, and extracts a text which is to constitute one line based on the document information stored in the document data storage area 112 and the line information stored in the line information entering part 114. The text developing part 117 also forms a digit-address table, and outputs developed data in correspondence with the digit-address table.

A color property discriminating part 118 enters the developed data from the text developing part 117, and discriminates the color property of each digit of the developed data based on the line and digit information from the present cursor position entering part 116. A discriminated result in the color property discriminating part 118 is outputted as a color information.

A color discrimination mark pattern storage area 120 stores pattern data of color discrimination marks which indicate the color property of the character and the like. A superimpose display part 121 enters from the color discrimination mark pattern storage area 120 the pattern datum of the color discrimination mark indicated by the color information from the color property discriminating part 118, and outputs the pattern datum.

The external memory part 20 and a character pattern storage area 122 store pattern data of characters. A character pattern entering part 123 enters and outputs the pattern data from the external memory part 20 and the character pattern storage area 122.

A text display data producing part 124 enters via the character pattern entering part 123 pattern data of the characters in the developed data from the text developing part 117, and outputs pattern data of the text which are obtained by combining the pattern data of the characters and the pattern data of the color discrimination marks received from the superimpose display part 121.

A guidance display data producing part 125 enters via the character pattern entering part 123 a pattern datum of the character which has the color property indicated by the color information from the color property discriminating part 118, and outputs this pattern datum of this character.

A ruled line data storage area 126 stores a ruled line information. A ruled line display data producing part 127 produces a pattern datum of the ruled line by reading out the ruled line information stored in the ruled line data storage area 126, and outputs the pattern datum of the ruled line.

A special character pattern storage area 128 stores pattern data of special characters which are made and registered by the user. A special character pattern entering part 129 enters from the special character pattern storage area 128 a pattern datum of a special character, and outputs this pattern datum as a pattern information.

An enlarged pattern data producing part 130 converts the pattern information entered from the special character pattern entering part 129 into an enlarged pattern, and outputs a pattern information on this enlarged pattern. A decimated pattern data producing part 131 converts the pattern information entered from the special character pattern entering part 129 into a decimated (reduced) pattern, and outputs a pattern information on this decimated pattern.

Based on the pattern information from the special character pattern entering part 129, the enlarged pattern producing part 130 and the decimated pattern producing part 131, a special character display data producing part 132 produces a pattern datum of the special character which is to be displayed.

A display data producing part 133 produces a display pattern datum based on the pattern data from the text display data producing part 124, the guidance display data producing part 125, the ruled line display data producing part 127 and the special character display data producing part 132. The display pattern datum from the display data producing part 133 is supplied to the display part 21.

Next, a description will be given with respect to an embodiment of a keyboard control process carried out by the control part 60 shown in FIG. 4 (the block system shown in FIG. 5) by referring to FIG. 7. When a keyboard control routine is started, a step S1 scans the key matrix 90 of the keyboard 25. A step S2 discriminates whether or not a key of the keyboard 25 is pushed, that is, whether or not there is input. The operation is returned to the step S1 when the discrimination result in the step S2 is NO. On the other hand, when the discrimination result in the step S2 is YES, a step S3 locks out the inputs from other keys which are pushed while the key is pushed. A step S4 prevents undesirable effects of chattering by eliminating the chattering of the key datum. A step S5 discriminates whether or not the input is a normal input as a result of the elimination of the chattering, and the operation is returned to the step S1 when the discrimination result is NO.

On the other hand, when the discrimination result in the step S5 is YES, a step S6 converts the key datum into a code datum, and a step S7 outputs the code datum. A step S8 discriminates whether or not the pushed key is a repeatable key, and the operation is returned to the step S1 when the discrimination result is NO. When the discrimination result in the step S8 is YES, a step S9 controls the repeat operation of the repeatable key, and the operation is thereafter returned to the step S1.

FIG. 8 shows an embodiment of a key input control process carried out by the control part 60 shown in FIG. 4 (the block system shown in FIG. 5). When a key input control routine is started, a step S11 enters the code datum (keyboard input) which is obtained by the keyboard control routine described before. A step S12 discriminates whether or not the apparatus is in a waiting state. When the discrimination result in the step S12 is YES, a step S13 blinks the display of the layout, and a step S14 discriminates whether or not there is an input from a key. The operation is returned to the step S11 when the discrimination result in the step S14 is NO.

When the discrimination result in the step S12 is NO or the discrimination result in the step S14 is YES, a step S15 discriminates whether or not the input code datum is an input mode code. When the discrimination result in the step S15 is YES, a step S16 changes the input mode, a step S17 displays the new input mode and the operation returns to the step S11.

In other words, the present embodiment of the information processing apparatus has three character input modes which are a hiragana input mode, an alpha-numeric input mode and a katakana input mode. The kana (hiragana and katakana) input mode can be selected between a kana mode in which the kana input is made directly in kana, and a Roman letter mode in which the kana input is made indirectly in Roman letter in accordance with the kana pronunciation by pushing the Roman letter key 35. The input mode is set to the alpha-numeric input mode by pushing the alpha-numeric key 34. When the input mode is to be changed from the alpha-numeric input mode to the hiragana input mode, only the hiragana key 32 needs to be pushed. In this case, the input mode is returned to the kana mode or the Roman letter mode of the kana input mode which was selected immediately before the input mode was changed from the alpha-numeric mode. The input can be made either with the full-width or the half-width by pushing the full/half width key 36. It is assumed that the input mode is initially set to the kana input mode with the full-width when the power is turned ON.

FIGS. 9A and 9B are diagrams for explaining the change in the input mode responsive to the pushing of a key. FIG. 9A shows the change in the input mode when a key is pushed, and FIG. 9B shows the change in the display made within a guidance display section 54 of the LCD device 26.

On the other hand, when the discrimination result in the step S15 is NO, a step S18 discriminates whether or not the pushed key is a function key which instructs a function indicated above or below the key (or indicated on the key top in brackets) when pushed simultaneously with the function select key 47. When the discrimination result in the step S18 is NO, a step S19 discriminates whether or not the input mode is a Roman letter mode. When the discrimination result in the step S19 is YES, a step S20 converts the input into a Roman letter input, and a step S21 discriminates whether or not a sequence of the Roman letters is correct in Japanese. The operation is returned to the step S11 when the discrimination result in the step S21 is NO.

On the other hand, a step S22 carries out the conversion of the full-width and half-width when the discrimination result in the step S19 is NO. A step S23 carries out the conversion of the function key when the discrimination result in the step S18 is YES.

Figure 10:
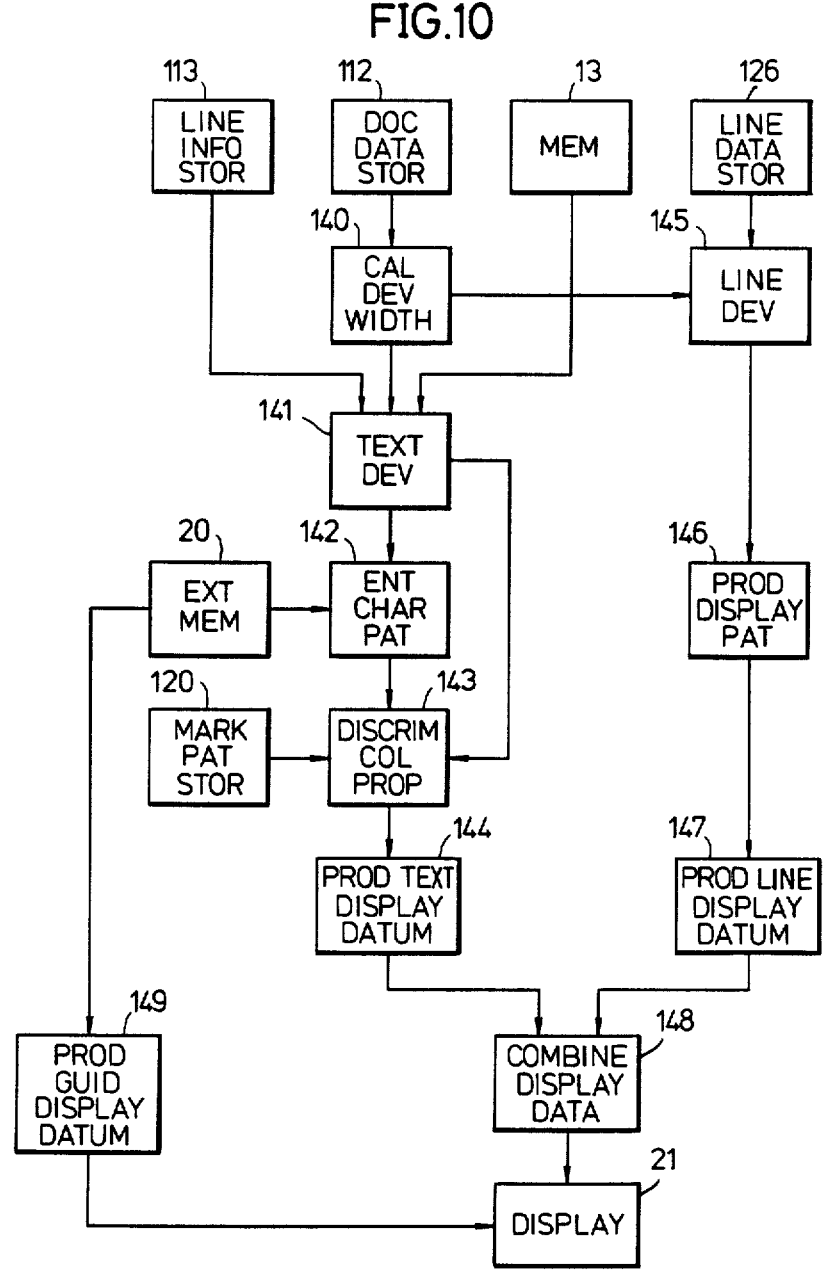
FIG. 10 is a function block diagram for explaining a display process.

Next, a description will be given with respect to a display process by referring to a function block diagram shown in FIG. 10. This function block diagram shows function blocks together with circuit or device blocks so as to facilitate the understanding of the display process. A function block 140 calculates the developing width of one line (that is, the maximum number of characters) based on the paper size, character pitch, line pitch and the like stored in the line information storage area 113. The block 140 corresponds to the text developing part 117 shown in FIG. 6. A function block 141 develops the text data from the memory part 13 based on the developing width from the block 140 and the right and left end information from the line information storage area 113. This block 141 also corresponds to the text developing part 117.

A function block 142 enters from the external memory 20 character patterns in accordance with the developed text data amounting to one line from the block 141. The block 142 corresponds to the character pattern entering part 123 shown in FIG. 6. A function block 143 discriminates the color property based on the developed text data from the block 141, and enters the color discrimination mark patterns from the color discrimination mark pattern storage area 120. The block 143 combines the developed text data and the color discrimination mark patterns and a function block 144 produces a text display data from output patterns of the block 143. The block 143 corresponds to the color property discriminating part 118 shown in FIG. 6, and the block 144 corresponds to the text display data producing part 124 shown in FIG. 6.

A function block 145 develops a ruled line to produce ruled line data amounting to one line, based on the developing width from the block 140 and the ruled line data stored in the ruled line data storage area 126. The block 145 corresponds to the ruled line display data producing part 127 shown in FIG. 6. A function block 146 produces display patterns based on the ruled line data from the block 145. This block 146 also corresponds to the ruled line display data producing part 127. A function block 147 produces ruled line display data from the display patterns received from the block 146. The block 147 also corresponds to the ruled line display data producing part 127.

A function block 148 combines (performs a logical sum operation on) the text display data from the block 144 and the ruled line display data from the block 147, and produces display data amounting to one line which is supplied to the display part 21. The block 148 corresponds to the display data producing part 133 shown in FIG. 6.

A function block 149 enters character patterns for the guidance display from the external memory 20, and produces guidance display data which are supplied to the display part 21. The block 149 corresponds to the guidance display data producing part 125 shown in FIG. 6.

Figure 11:
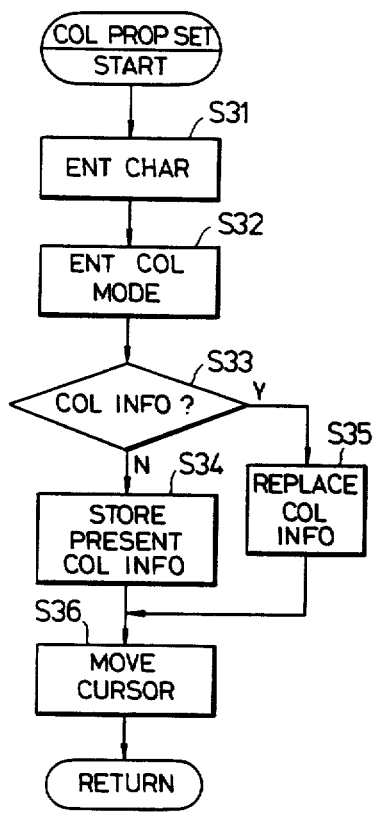
FIG. 11 is a flow chart for explaining a color property setting process.

Next, a description will be given with respect to an embodiment of a color property setting process carried out by the control part 60 shown in FIG. 4, by referring to FIG. 11. The color property setting process is carried out when a color setting key of the function key group 50 is pushed.

When a color property setting routine is started in FIG. 11, a step S31 enters from the memory 13 the character at the present cursor position based on the present cursor position and the digit-address table which is formed by the text developing stage which will be described later. A step S32 enters the color mode which is presently set. A step S33 discriminates whether or not the entered character already has a color property information. A step S34 stores the color property information which is presently set into the memory 13 when the discrimination result in the step S33 is NO. On the other hand, when the discrimination result in the step S33 is YES, a step S35 replaces the previous color property information by the color property information which is presently set. After the step S34 or S35, a step S36 moves the cursor to the position of the next character, and the process ends.

Next, a more detailed description will be given with respect to the color property setting process. The color property is set by obtaining the character at the present cursor position based on the present cursor position and the digit-address table, and adding the color property information which is presently set to the character.

It will be assumed that seven colors can be identified by the color property discrimination mark. The seven colors are red, blue, yellow, green, pink, purple and black. For example, the relationship between the color, color property datum and the color property discrimination mark is as shown in the following Table. In the Table, the color property datum is simply referred to as color datum, and the color property discrimination mark is simply referred to as discrimination mark.

TABLE

| Color | Color Datum | Discrimination Mark |
|---|---|---|
| Red | 1 | ○ |
| Blue | 2 | □ |
| Yellow | 3 | △ |
| Green | 4 | ⌀ |
| Pink | 5 | ⊗ |
| Purple | 6 | ▽ |
| Black | None | None |

Figure 12:
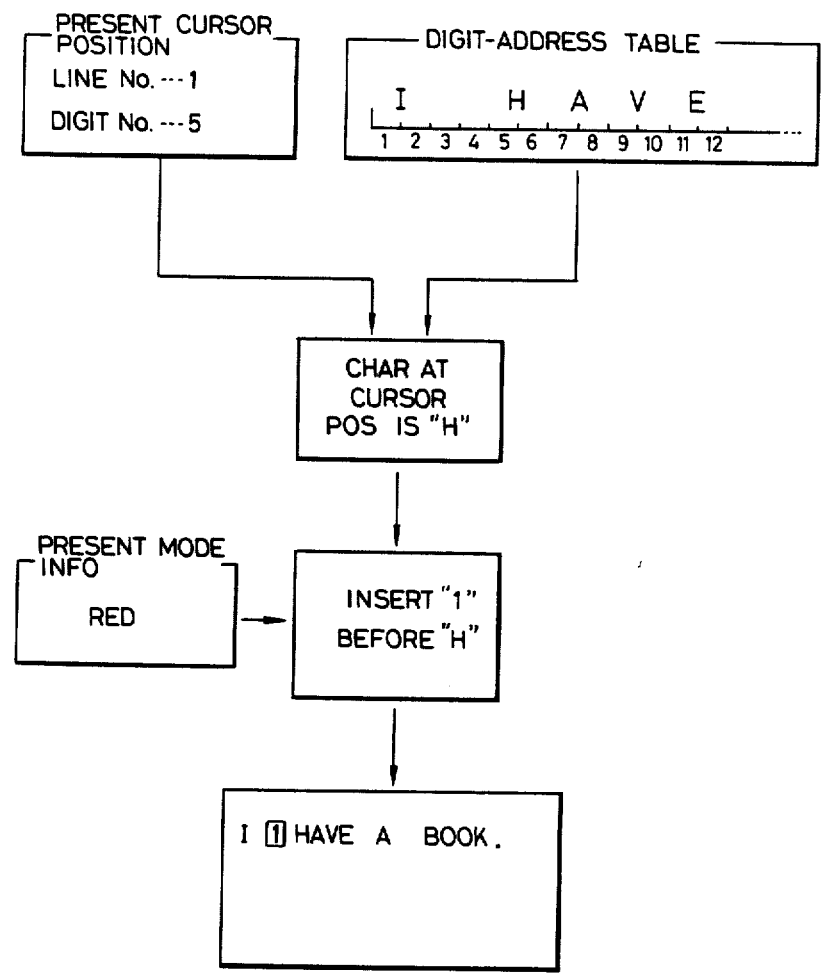
FIG. 12 is a diagram for explaining the color property setting process.

As shown in FIG. 12, it is assumed that the present cursor position is at the line number 1 (first line) and digit number 5 (fifth digit), and the digit numbers 1 through 12 in the digit-address table of the line where the present cursor position is located contain "I", "SPACE", and "H", "A", "V", "E". Each character has the full-width in FIG. 12 for convenience sake.

In this case, it is found from the present cursor position and the character address information in the digit-address table that the character at the present cursor position (digit number 5) is "H".

When the present mode information is "red", a color property datum "1" indicating the color "red" is inserted before the character "H". Hence, in the document data (text data), the color property datum "1" (indicated within a rectangular mark) is added in front of the character "H".

In case a color property datum "2" indicating the color "blue" is already added before the character "H", this color property datum "2" is replaced by the color property datum "1" in accordance with the present mode information.

Figure 13:
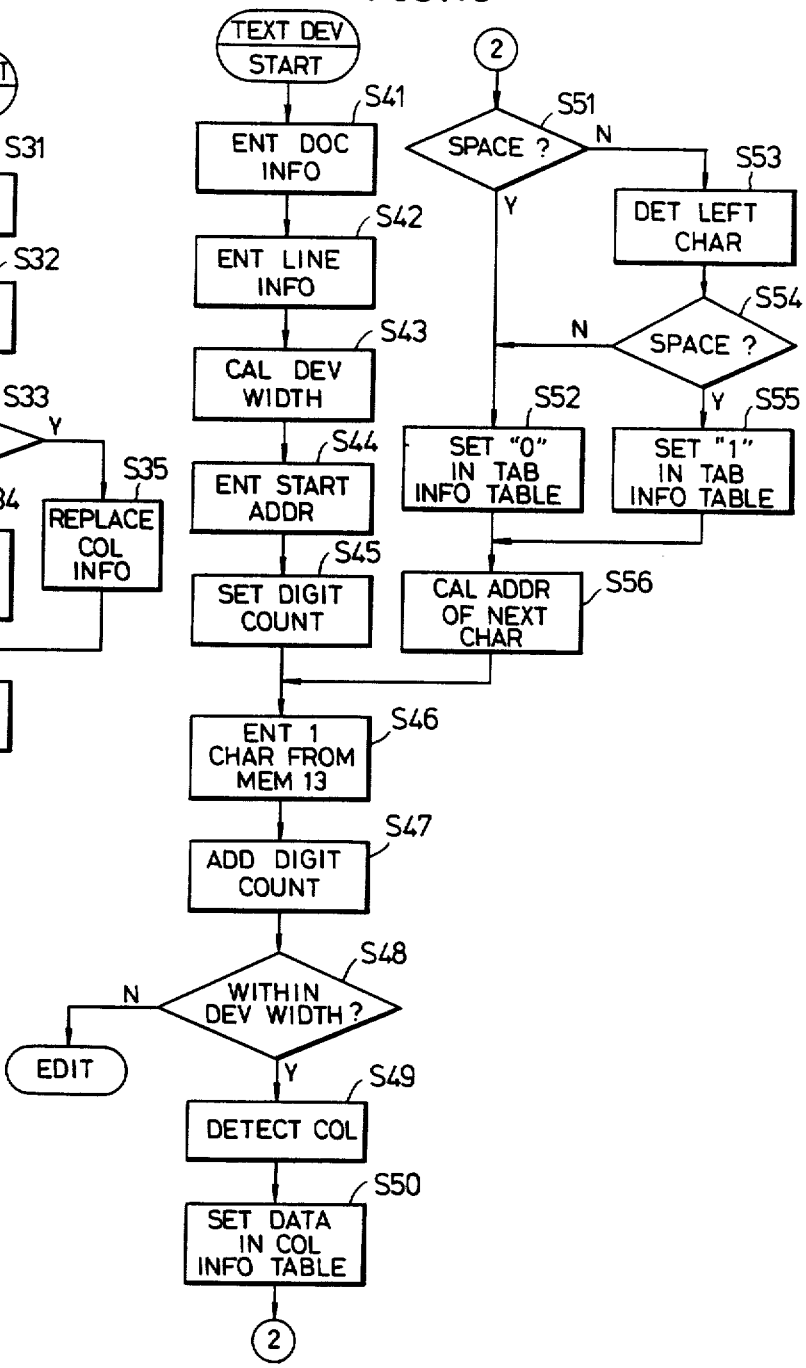
FIG. 13 is a flow chart for explaining a text developing process.

Next, a description will be given with respect to an embodiment of a text developing process carried out by the control part 60 shown in FIG. 4, by referring to FIG. 13. When a text developing routine is started in FIG. 13, a step S41 enters the document information such as the paper size, character pitch and the line pitch. A step S42 enters the line information such as the right and left end information. A step S43 calculates the developing width (number of digits) of one line. A step S44 enters a starting address where the developing starts, and a step S45 sets a digit counter to "0".

A step S46 enters one character from the memory 13, and a step S47 adds to the digit count the number of digits occupied by the character. A step S48 discriminates whether or not the datum is within the developing width, based on the counted value in the digit counter and the calculated developing width. The operation advances to an editing process such as the developing of the data on the next line, for example, when the discrimination result in the step S48 is NO. But when the discrimination result in the step S48 is YES, a step S49 detects the color property of the character and a step S50 sets a datum which corresponds to the detected color into the corresponding line of the color information table.

A step S51 thereafter discriminates whether or not the character is a space. When the discrimination result in the step S51 is YES, a step S52 sets "0" into the corresponding line of the tab information table. On the other hand, when the discrimination result in the step S51 is NO, a step S53 detects the character on the left thereof, and a step S54 discriminates whether or not the left character is a space. The operation advances to the step S52 when the discrimination result in the step S54 is NO. But when the discrimination result in the step S54 is YES, that is, when the character is not a space and the character on the left thereof is a space, a step S55 sets "1" into the corresponding line of the tab information table to indicate the tab position (tab skip position). After the step S52 or S55, a step S56 calculates the address of the next character, and the operation returns to the step of entering one character from the memory 13.

Next, a more detailed description will be given on the text developing process by referring to FIGS. 14 and 15. In the information processing apparatus, the character which is processed may either have the full-width or the half-width, and the apparatus must carry out the control in units of one digit. In the case where the character is determined by a Chinese character code, the text data is stored as character codes having two bytes per character. The address (character address information) in the document storage area (memory 13) of each character is set in the digit-address table. This address indicates a relative address from the beginning of the text data, and the address from the beginning in this case is "0", "2", "4", . . . The digit-address table has two bytes per digit so that all of the characters may have the half-width.

Since the character having the full-width has twice the width of the character having the half-width and accordingly requires two digits, the character address information itself can be described in two bytes (one digit). For this reason, the two bytes in the second digit following the first digit becomes empty and free in the case of the character having the full-width.

On the other hand, a double-width (enlarged) character has four times the width of the character having the half-width, and four digits are required therefor. But again, the character address information itself can be described in two bytes (one digit). Accordingly, three digits (six bytes) following the first digit become empty and free in the case of the character having the double-width.

Therefore, in the present embodiment, the developing information (two bytes) indicative of the predetermined character attribute is added in the empty area (digits). It will be assumed that the developing information is "−1" when the character attribute indicates that the character is outside the right and left ends, "−2" when the character attribute indicates that the character has the full-width, and "−3" when the character attribute indicates that the character has the double-width.

A reference will now be made to FIGS. 14A through 14C to explain the formation of the digit-address table in the text developing process for the case where no color property setting is made. In this case, as shown in FIG. 14A, it is assumed that the left end is 10 digits from the left limit and the right end is 40 digits from the left limit regarding the line information, and the paper size is A4, the line pitch is ⅙ inch and the character pitch is 4 dots regarding the document information. Furthermore, the document data is such that the characters "A, B, C, D, E" have the full-width, the characters "F, G, H, I" have the half-width, the characters "J, K" have the double-width, and the characters "L, M, O, P, Q, R, S, T, U, V" have the full-width. Accordingly, based on the document information and the line information, the number of lines is 40, the number of characters with the full-width is 48, and the developing width is 30 digits.

When the developing of the text data is started from the character "A", the character "A" with the full-width requires two digits as shown in the digit-address table of FIG. 14B. Hence, the character address information (indicated by "A" in FIG. 14B for convenience sake, and similarly for other characters) having two bytes is stored in the first digit, and the character attribute "−2" (full-width skip information) indicating that the character has the full-width is stored in the second digit. The developing is carried out similarly for the other characters "B, C, D, E" having the full-width in the third through tenth digits.

As for the character "F" having the half-width, only one digit is required, and the character address information having two bytes is stored in the eleventh digit. The developing is carried out similarly for the other characters "G, H, I" having the half-width in the twelfth through fourteenth digits.

The character "J" having the double-width requires four digits, and the character address information is stored in the fifteenth digit (first one of the required four digits) and the character attribute "−3" (double-width skip information indicating that the character has the double-width is stored in the sixteenth through eighteenth digits (remaining three of the required four digits). The developing is carried out similarly for the other character "K" having the double-width in the nineteenth through twenty-second digits.

The developing of the characters "L, M, N, O, . . . , V" having the full-width is carried out similarly as the developing of the character "A", from the twenty-third digit. However, when the thirtieth digit is exceeded, the character attribute "−1" is stored from the thirty-first digit to indicate that the character is outside the right and left ends.

By carrying out the developing in this manner, the developing text data shown in FIG. 14C is obtained. Since the developing width is 30 digits per line, the line ends at the character "O", and the developing of the text for the next line is carried out when the address of the next character "P" where the developing is to start is obtained.

Next, a description will be given with respect to the formation of the digit-address table and the color information table when the color property is set, by referring to FIGS.15A through 5D. In this case, it will be assumed that the line information and the document information are identical to those shown in FIG. 14A. However, it will be assumed that the document data read "I HAVE A BOOK.I", and the color property information "1" is added as shown to indicate that the color property of "HAVE" and "BOOK" is "red".

In this case, the digit-address table shown in FIG. 15B is obtained by developing the document data shown in FIG. 15A. Each character has the full-width.

The color information table shown in FIG. 15C is obtained in this case by detecting the color property of each character and setting the data corresponding to the colors in the corresponding digits. The first character "I", the character "A"between "HAVE" and "BOOK", the period "." and the last character "I" have no color property information added thereto since the color is set to "black", and the color property datum "0" is set for these characters. The characters in the character sequences "HAVE" and "BOOK" have the color property information added thereto to indicate that these characters have the color property "red". In other words, the color property datum "1" is set for these characters in the character sequences "HAVE"

and "BOOK". The developing data for this case is shown in FIG. 15D.

The description on the formation of the tab information table in this text developing process will be described later on in the present specification.

Next, a description will be given with respect to an embodiment of a process for displaying one line, by referring to FIG. 16. This process is carried out by the control part 60 shown in FIG. 4 (block system shown in FIG. 6).

Figure 16:
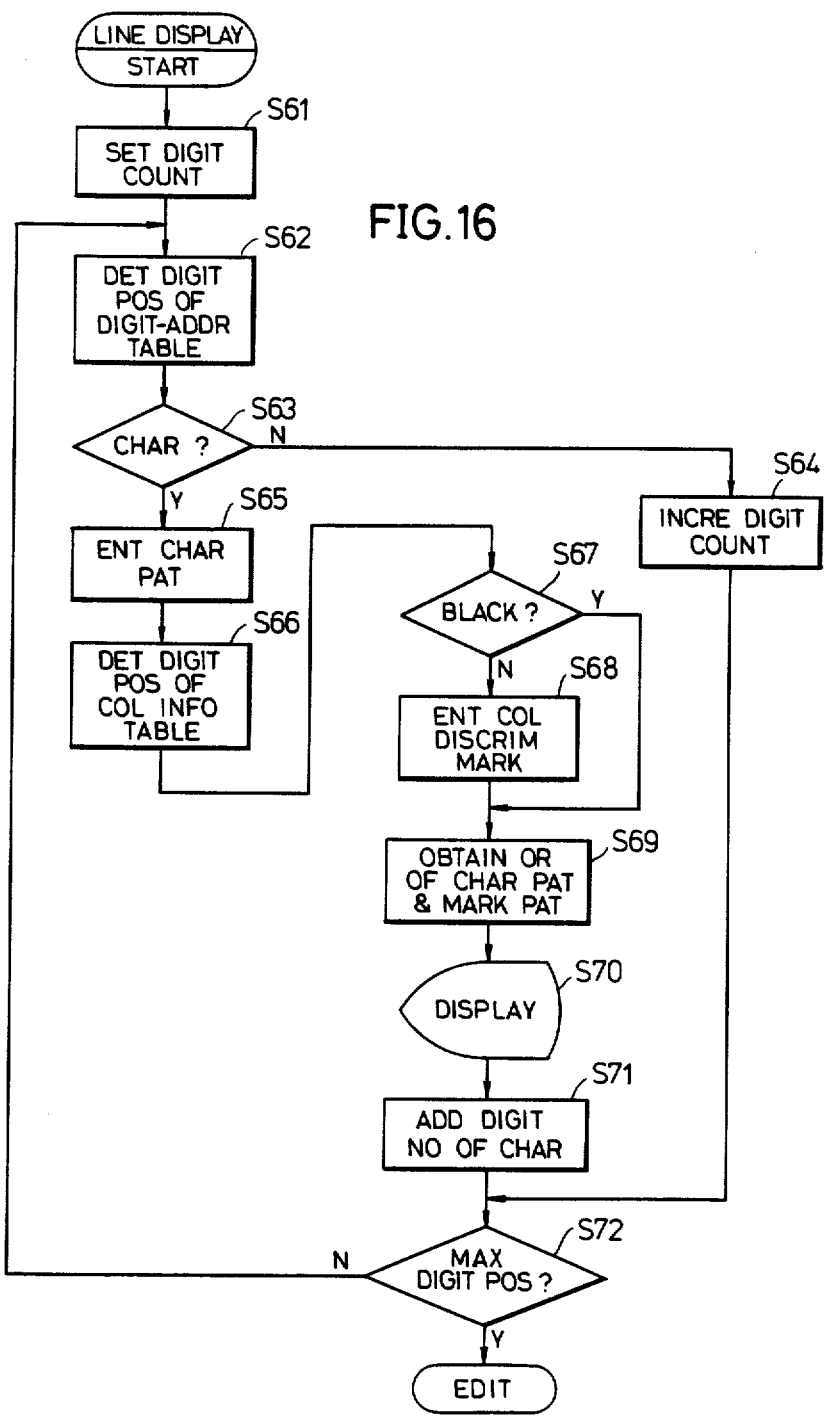
FIG. 16 is a flow chart for explaining a line display control process.

When a line display routine is started in FIG. 16, a step S61 sets "0" into the digit counter, and a step S62 detects the corresponding digit position in the digit-address table. A step S63 discriminates whether or not a character exists. When the discrimination result in the step S63 is NO, a step S64 increments the digit counter by one. But when the discrimination result in the step S63 is YES, a step S65 enters the character pattern of the character from the character generator.

A step S66 detects the corresponding digit position in the color information table, and a step S67 discriminates whether or not the color property of the character is "black". When the discrimination result in the step S67 is NO, a step S68 enters from the color discrimination mark pattern storage area the pattern of the color discrimination mark corresponding to the color property of the character. A step S69 carries out a logical sum operation on the character pattern obtained in the step S65 and the pattern of the color discrimination mark obtained in the step S69. A combined pattern obtained in the step S69 is displayed within the editing display section 51 of the LCD device 26 in a step S70. A step S71 adds to the digit counter the number of digits of the character. After the step S64 or S71, a step S72 discriminates whether or not a maximum digit position is reached. The operation is returned to the step S62 when the discrimination result in the step S72 is NO, so as to detect the corresponding digit position in the digit-address table. On the other hand, the operation advances to the editing process when the discrimination result in the step S72 is YES.

A more detailed description will now be made on the process of displaying one line, by referring to FIGS. 17A through 17C. First, it will be assumed that the display is to be made for a line for which the digit-address table and the color information table are formed identically to those shown in FIGS. 15B and 15C. In this case, the character "I" is found when the first digit in the digit-address table is checked. When the character pattern for this character "I" is read out and this first digit in the color information table is checked, the first digit is "0" which means "BLACK". Hence, the character pattern is displayed as it is. When the digit counter is incremented by one to check the second digit, the full-width skip information is found in the second digit. Hence, the digit counter is further incremented by one to check the third digit. As shown, the third and fourth digits are spaces. When the fifth digit is checked, the character "H" is found. The checking is made in a similar manner for the other remaining digits.

The fifth digit in the color information table is "1" which means "red". Thus, the character pattern for the character "H" and the color discrimination pattern for "red" are combined and displayed simultaneously.

Thereafter, similar processings are repeated up to the thirtieth digit in the digit-address table, and the process of displaying one line is ended when the thirtieth digit is reached because the maximum number of digits is thirty in this case.

Accordingly, the character display data "I HAVE A BOOK.I" shown in FIG. 17A and the color property display data indicated in FIG. 17B by circular patterns which are the color discrimination pattern for "red" are combined, and the display data shown in FIG. 17C is displayed. As shown in FIG. 17C, the circular marks are superimposed on the characters "HAVE" and "BOOK" to indicate that the color property of these characters "HAVE" and "BOOK" are "red".

In the conventional information processing apparatus, a color discrimination mark which takes up the display area of one character is displayed beside a character to indicate the color property of the character. For this reason, the color discrimination mark and the character itself take up the display area of two characters on the display. But when this character is printed, only the character is printed with the color indicated by the color discrimination mark, and the color discrimination mark is of course not printed. In other words, in the conventional information processing apparatus, there is a problem in that the editing format on the display and the printing format on the paper do not coincide. As a result, it is difficult for the user to see from the display format what the actual printing format would look like when there are color discrimination marks in the editing format. This means that the user must often print out the document to actually see the printing format and then make appropriate adjustments in the editing format to adjust the layout such as line endings when the color setting of the characters is made.

On the other hand, according to the present embodiment, the character and the color discrimination mark which indicates the color property of the character are superimposed and are simultaneously displayed within the display area of one character on the display. As a result, the editing format and the printing format coincide. Hence, even when the color setting of the characters is made, it is necessary for the user to consider what the actual printing format would look like while the characters are entered in the editing format because the printing format would be identical to the editing format.

Figure 18:
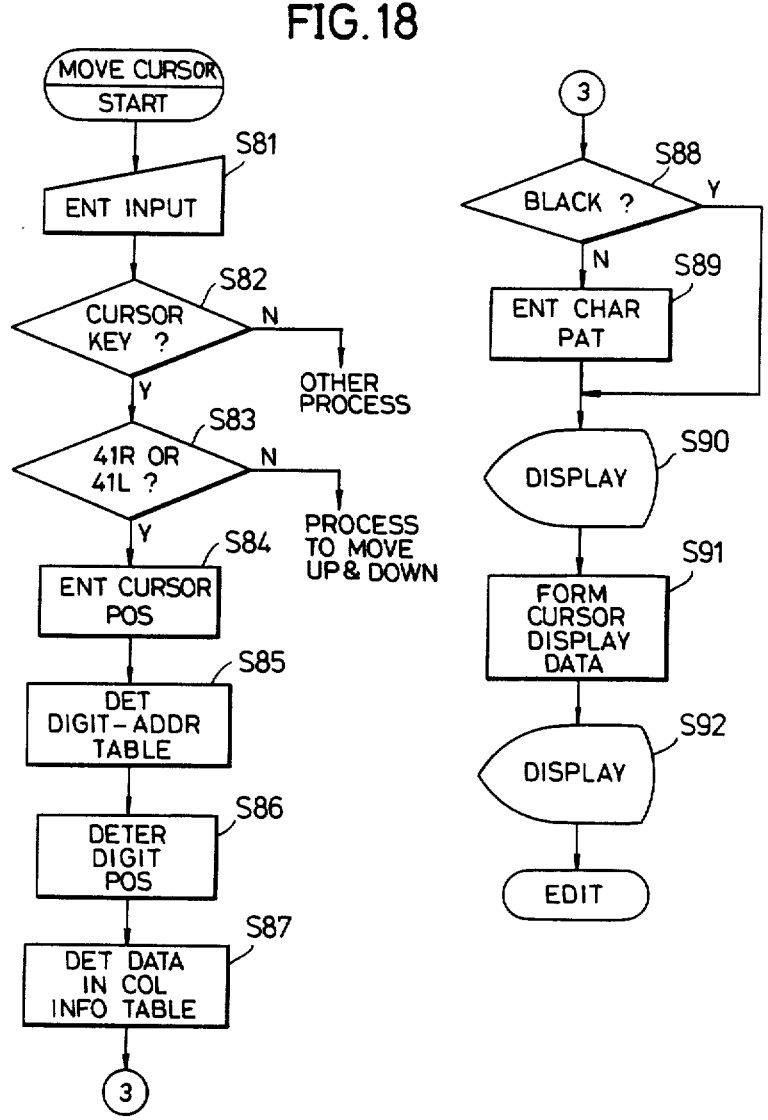
FIG. 18 is a flow chart for explaining a cursor moving process.

Next, a description will be given on a cursor moving process. FIG. 18 shows an embodiment of the cursor moving process carried out by the control part 60 shown in FIG. 4. When a cursor moving routine is started in FIG. 18, a step S81 enters the input from the key. A step S82 discriminates whether or not the input is entered from the cursor key. The operation advances to other routines when the discrimination result in the step S82 is NO. On the other hand, when the discrimination result in the step S82 is YES, a step S83 discriminates whether or not the cursor key is one of the cursor keys 41R and 41L which are used to move the cursor to the right and left (that is, horizontally).

When the discrimination result in the step S83 is YES, a step S84 enters the present cursor position and a step S85 detects the digit-address table at the present cursor position. A step S86 determines the digit position (cursor destination) where the cursor is to be moved. A step S87 detects the datum of the color information table at the digit position where the cursor is to be moved.

A step S88 discriminates whether the datum detected in the step S87 is "0", that is, "black". When the discrimination result in the step S88 is NO, a step S89 enters from the character generator the character pattern of the character which has the color property described by the datum detected in the step S87, and a step S90 displays the character within the guidance display section 54 of the LCD device 26. A step S91 forms a cursor display data, and a step S92 displays the cursor display datum.

The operation jumps from the step S88 to the step S90 when the discrimination result in the step S88 is YES.

When the input is entered from the cursor key 41U or 41L and the discrimination result in the step S82 is NO, the cursor is moved across the lines at the same cursor digit position (that is, moved up and down or vertically). Hence, processes similar to those described above are carried out by detecting a datum in the color information table at a digit position identical to the present cursor position in the digit-address table of the preceding or succeeding line.

A more detailed description will now be made on the cursor moving process, by referring to FIGS. 19A through 19D. In FIGS. 19A through 19D, it is assumed for convenience sake that all of the characters have the full-width as described before. Hence, each character uses two digits, and the character address information is stored in the first of the two digits while the full-width skip information is stored in the second of the two digits.

For example, when the cursor key 41R is pushed when the cursor is at the fifth digit in the digit-address table, the seventh digit of the digit-address table is checked because the sixth digit contains the full-width skip information. The character address information of the character "A" is stored in the seventh digit, and this seventh digit is determined as the cursor destination. Hence, the cursor is moved and displayed at the seventh digit position.

When the cursor key 41R is pushed again in this state, the cursor is moved to the ninth digit position. Similarly thereafter, the cursor is move to the eleventh, thirteenth, ... digit positions every time the cursor key 41R is pushed. The cursor moves in the opposite direction, that is, to the left, when the cursor key 41L is pushed.

In addition, the determined digit position (cursor destination) in the color information table is then checked. For example, only the moving cursor is displayed when the cursor is moved from the first digit to the third digit because the third digit contains the datum "0" ("black") in the color information table as shown in FIG. 19B. But when the cursor is moved from the third digit to the fifth digit, the moving cursor and an indication "red" are displayed since the fifth digit contains the datum "1" ("red").

Figure 19A:
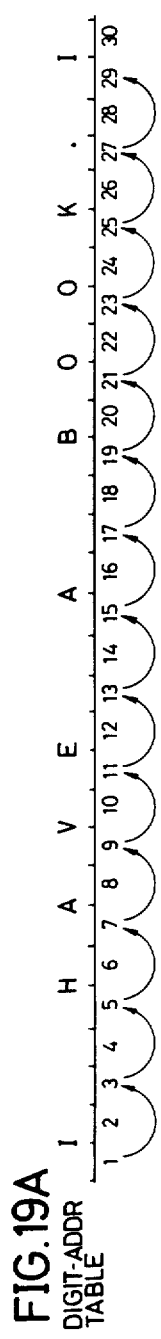
FIGS. 19A through 19D are diagrams for explaining the cursor moving process.
Figure 19B:
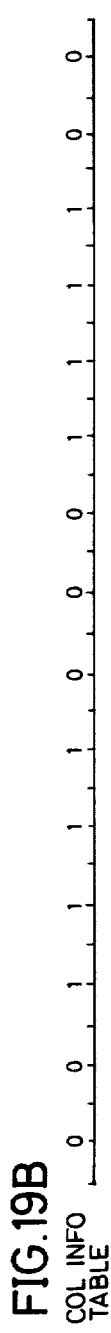

In this case, as shown in FIG. 19B, the datum "1" indicating "red" is set in the digits corresponding to the characters "HAVE" and "BOOK" shown in FIG. 19A. Hence, when the cursor is moved from the position shown in FIG. 19C corresponding to the position of the space at the third digit to the position shown in FIG. 19D, the indication "red" is also displayed in the guidance display section 54 of the LCD device 26 beside a guidance "1. 08. 13" which indicates the page, line and digit so as to indicate that the color property of the character "H" at the present cursor position is "red".

Figure 19C:
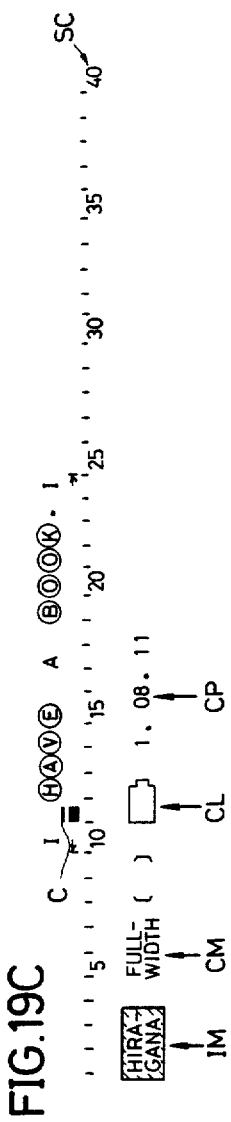
Figure 19D:
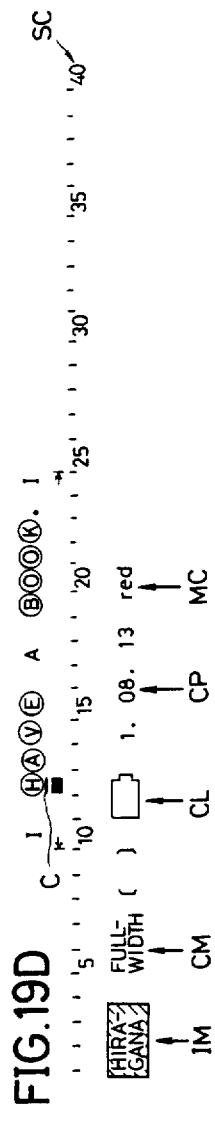

In FIGS. 19C and 19D, SC denotes the scale, IM denotes the input mode, CM denotes tee full/half width mode, CL denotes the second level character set by the Japanese Industrial Standards, CP denotes the page, line and digit, and MC denotes the color property indication.

Accordingly, it is also possible to make the editing format coincide with the printing format by displaying the color property indication for the character a the present cursor position.

The color property of the character can be detected in the editing format with extreme ease by displaying both the color discrimination mark and the color property indication.

Figure 20:
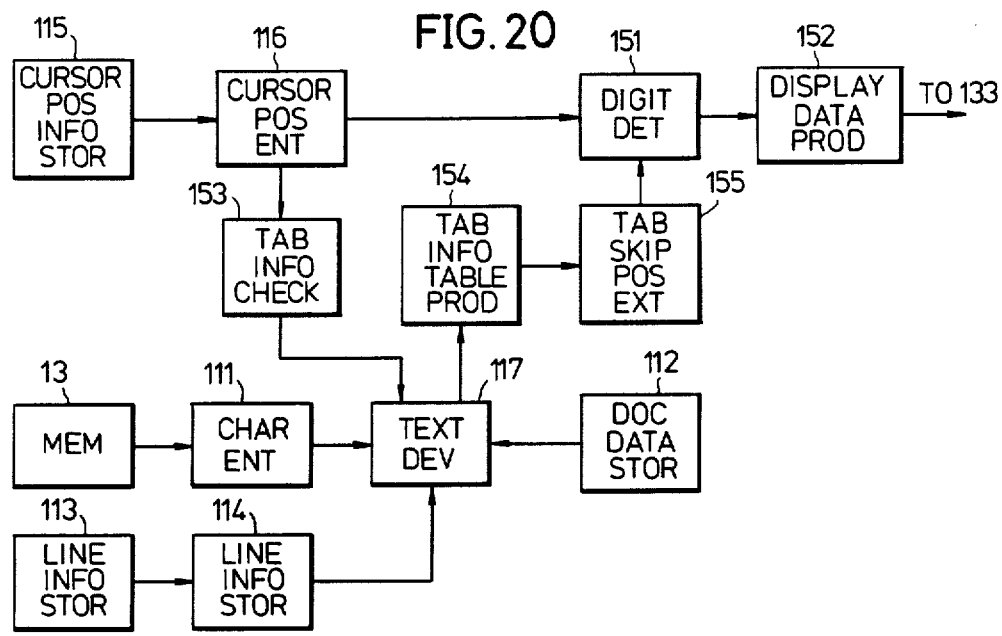
FIG. 20 is a system block diagram showing an embodiment of a part of the block system shown in FIG. 1.

Next, a description will be given on a tab skip process. FIG. 20 shows an embodiment of a part of the block system shown in FIG. 1 for carrying out the tab skip process. In FIG. 20, those parts which are the same as those corresponding parts in FIG. 6 are designated by the same reference numerals, and description thereof will be omitted.

In FIG. 20, a digit determining circuit 151 determines a digit position of the cursor destination based on a tab information from a tab skip position extracting circuit 155 and the present cursor position information from the present cursor position entering part 116. A cursor display data producing circuit 152 produces a display datum for displaying the cursor at the digit position determined in the digit determining circuit 151, and supplies this display data to the display data producing part 133 shown in FIG. 6. Based on the line and digit information from the present cursor position entering part 116, a tab information checking circuit 153 determines the starting and ending lines in which the tab information is to be checked, and outputs a developing request on the target line. The developing request is supplied to the text developing part 117. A tab information table producing circuit 154 checks the existence of the tab information on the developing result obtained in the text developing part 117, and produces the tab information table. The tab skip position extracting circuit 155 outputs a tab skip digit position based on the tab information table produced in the tab information table producing circuit 154.

Figure 21:
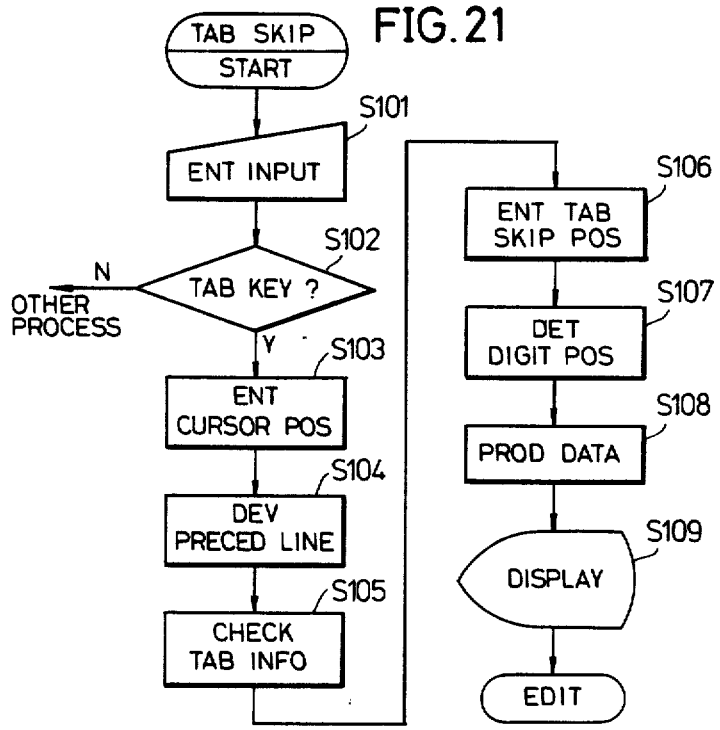
FIG. 21 is a flow chart for explaining a first embodiment of a tab skip process.

A description will now be given on a first embodiment of a tab skip routine carried out in the control part 60 shown in FIG. 4 (block system shown in FIG. 20), by referring to FIG. 21. When the tab skip routine is started in FIG. 21, a step S101 enters an input from a key, and a step S102 discriminates whether or not the input is from the tab key 45. The operation advances to other processes when the discrimination result in the step S102 is NO.

On the other hand, when the discrimination resulting the step S102 is YES, a step S103 enters the present cursor position, and a step S104 develops the immediately preceding line. A step S105 checks the tab information table for this immediately preceding line which is developed, and a step S106 enters the tab skip position.

A step S107 determines the digit position of the cursor destination based on the tab skip position which is entered in the step S106, and a step S108 produces a cursor display datum for displaying the cursor at the digit position (cursor destination) determined in the step S107. A step S109 displays the cursor display datum at the cursor destination.

Next, a more detailed description will be given on the tab skip process, by referring to FIGS. 22A and 22B. It will be assumed that the immediately preceding line has the character sequence shown in FIG. 22A. That is, spaces indicated by phantom lines exist in the first through eighth digits, characters "Al" exist in the ninth through twelfth digits, spaces exist in the thirteenth through sixteenth digits, and characters "SUMMARY" exist in the seventeenth through thirtieth digits. A cursor (carriage) return mark is shown in the thirty-first and thirty-second digits.

During the text developing process, the tab information table is formed by setting "0" when the target character is a space or when the target character is not a space and a character on the left thereof is also not a space, and setting "1" when the target character is not a space but the character on the left thereof is a space, as described before in conjunction with FIG. 13.

Accordingly, in this case, "1" is set in the tab information table at the ninth digit which corresponds to the first of the two digits allocated for the character "A" and at the seventeenth digit which corresponds to the first of the two digits allocated for the character "S" as shown in FIG. 22B, so as to indicate the tab positions (tab skip positions).

When the tab key 45 is pushed when the cursor is at the first digit on a predetermined line immediately succeeding the line (the line referred before as the immediately preceding line) shown in FIG. 22A, the cursor skips automatically from the first digit to the ninth digit (first of the two digits allocated for the character "A") as indicated by the arrow in FIG. 22B. When the characters "A1" are entered and the tab key 45 is pushed again when the cursor is at the thirteenth digit on the predetermined line, the cursor skips automatically to the seventeenth digit (first of the two digits allocated for the character "S") as indicated by the arrow in FIG. 22B. In other words, the tab function is achieved without the need to manually set the tab positions.

The tab skip process is carried out based on the tab information on the immediately preceding line. For this reason, when creating the document shown in FIG. 23, for example, the cursor on line 2 will skip automatically to a position corresponding to the position of the character "A" on line 1 when the tab key 45 is pushed in a state where the cursor is located at the start of line 2. When the characters "(2)CDE" are entered and the tab key 45 is pushed again, the cursor will skip automatically to a position corresponding to the position of the character "1" on line 1. Similarly, when the tab key 45 is pushed in a state where the cursor is located at the start of line 3, the cursor skips automatically to a position corresponding to the position of the character "C" on line 2. When the characters "IJKL" are entered and the tab key 45 is pushed again, the cursor skips automatically to a position corresponding to the position of the character "F" on line 2.

In other words, in the present embodiment, the position of the character located immediately after a sequence of spaces is automatically recognized as the tab position. Hence, the user does not need to manually set the tab positions, and the operation efficiency of the information processing apparatus is extremely satisfactory especially when a large number of tab positions are required.

Figure 24:
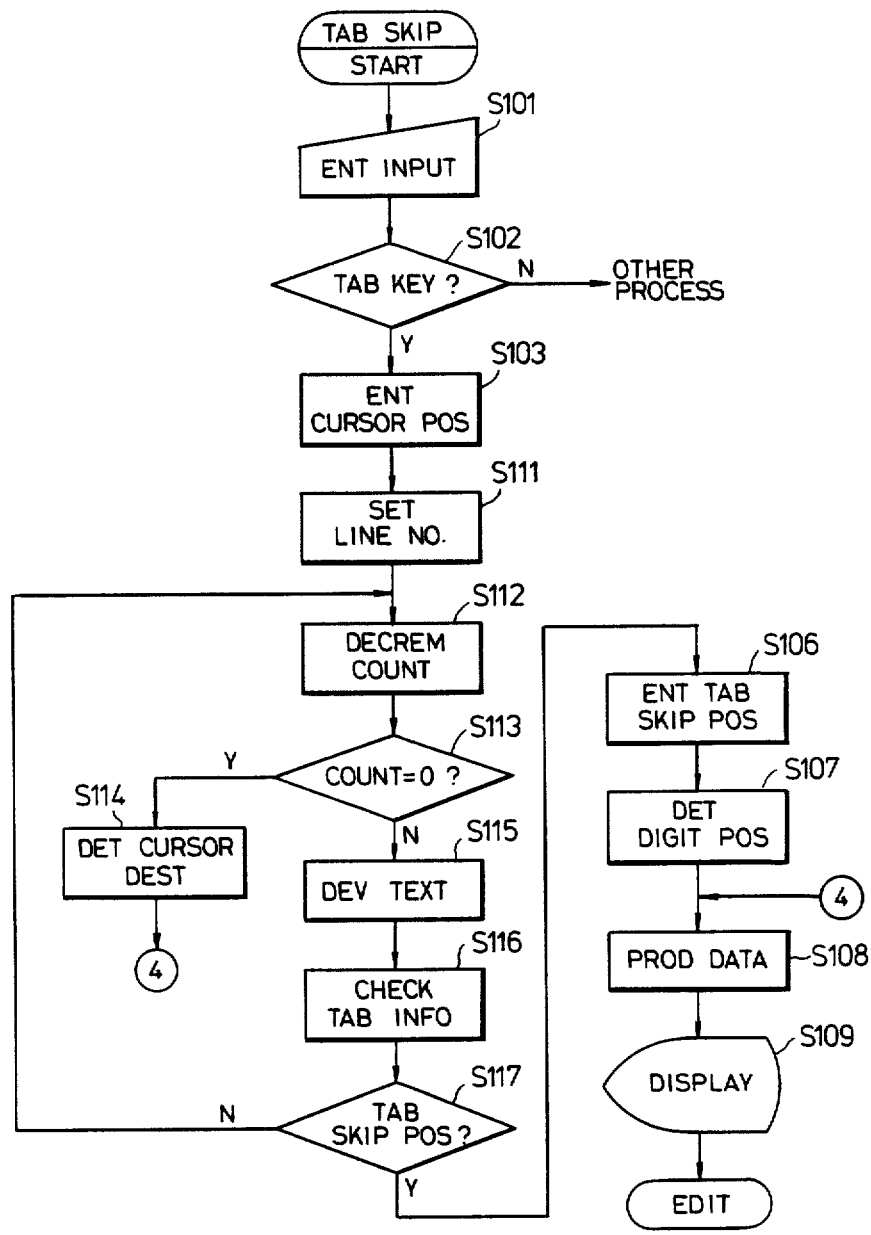
FIG. 24 is a flow chart for explaining a second embodiment of the tab skip process.

Next, a description will be given on a second embodiment of the tab skip routine carried out in the control part 60 shown in FIG. 4 (block system shown in FIG. 20), by referring to FIG. 24. In FIG. 24, those parts which are the same as those corresponding parts in FIG. 21 are designated by the same reference numerals, and description thereof will be omitted.

A step S111 sets the present line number into a line counter. A step S112 decrements the value in the line counter by one, and a step S113 discriminates whether or not the value in the line counter is "0". When the discrimination result in the step S113 is YES, a step S114 determines the cursor destination to a digit position immediately on the right of the present digit position (cursor position), and the operation advances to the step S108.

But when the discrimination result in the step S113 is NO, a step S115 develops the text of the line instructed by the value in the line counter. A step S116 checks the tab information on the line which is developed, and a step S117 discriminates whether or not a tab skip position exists. The operation returns to the step S112 when the discrimination result in the step S117 is NO. But the operation advances to the step S106 when the discrimination result in the step S117 is YES.

FIG. 25A shows an example of the tab skip process, according to the second embodiment. In FIG. 25A, four spaces are located on the first through eighth digits and the characters "AB" are located on the ninth through twelfth digits on line 1. The characters "X", "Y" and "Z" are located on lines 2, 3 and 4, respectively. When the tab key 45 is pushed in a state where the cursor is located at the start of line 5, the cursor skips automatically to the ninth digit as shown, and the characters "CD" are entered therefrom. The tab position is set automatically in accordance with the tab position on the nearest line which is line 1 in this case.

FIG. 25B shows another example of the tab skip process according to the second embodiment. In FIG. 25B, after the lines 1 and 2 are entered, the cursor skips automatically to the ninth digit in each of lines 3, 4, 6 and 7 when the tab key 45 is pushed in a state where the cursor is located at the start of the line, in accordance with the tab position on line 2.

It is evident that the block system shown in FIG. 20 can be used to carry out the process shown in FIG. 24 by simply modifying the operations of the tab information checking circuit 153 and the tab information table producing circuit 154.

Figure 26:
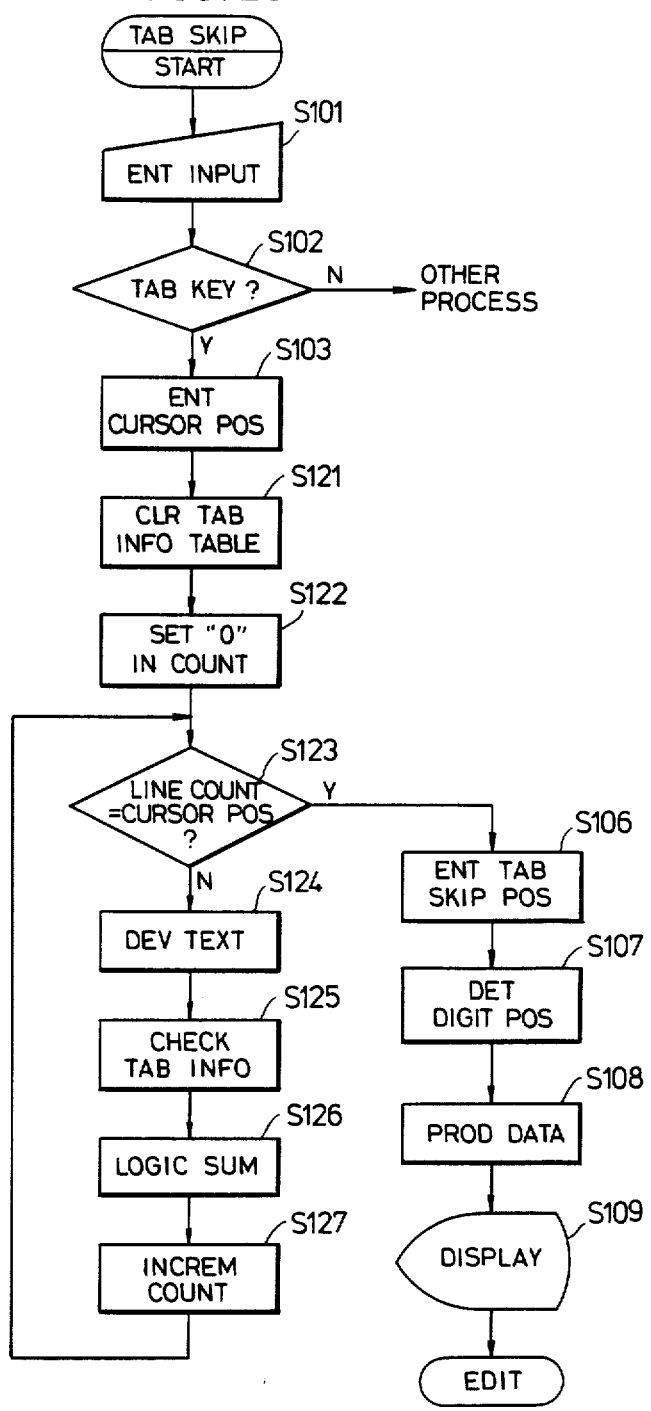
FIG. 26 is a flow chart for explaining a third embodiment of the tab skip process.

Next, a description will be given on a third embodiment of the tab skip routine carried out in the control part 60 shown in FIG. 4 (block system shown in FIG. 20), by referring to FIG. 26. In FIG. 26, those parts which are the same as those corresponding parts in FIG. 21 are designated by the same reference numerals, and description thereof will be omitted.

A step S121 clears the tab information table, and a step S122 is set "0" into the line counter. A step S123 discriminates whether or not the line on which the cursor is presently located is the same as the line instructed by the value in the line counter. The operation advances to the step S106 when the discrimination result in the step S123 is YES.

On the other hand, when the discrimination result in the step S123 is NO, a step S124 develops the text of the line which is instructed by the value in the line counter. A step S125 checks the tab information on the line which is developed. A step S126 writes into the tab information table the tab information on the line which is developed by carrying out a logical sum operation. A step S127 increments the value in the line counter by one, and the operation returns to the step S123.

In other words, when line 1 contains the information shown in FIG. 27A, the tab information table for line 1 is as shown in FIG. 27B. When line 2 contains the information shown in FIG. 27C, the tab information shown in FIG. 27D is obtained when the step S125 checks the tab information on line 2 which is developed. However, because the tab information table shown in FIG. 27B is already made at line 1, a logical sum of the tab information shown in FIG. 27B and the tab information shown in FIG. 27D is written into the tab information table in the step S126. As a result, the tab information shown in FIG. 27E is written into the tab information table. As may be seen from FIG. 27E, there are three tab positions in this case as indicated by the "1"s.

Therefore, when lines 1 and 2 contain the information shown in FIG. 28, the tab positions are automatically set at three positions indicated by downwardly pointed arrows, and the cursor skips as indicated by the arrows on lines 3 through 6.

It is evident that the block system shown in FIG. 20 can be used to carry out the process shown in FIG. 26 by simply modifying the operations of the tab information checking circuit 153 and the tab information table producing circuit 154.

The embodiments referred heretofore are described for the case where the characters have the full width (except for the numerals and symbols in FIGS. 27 and 28), but the present invention is not limited to this case and is also applicable when the characters have the half-width, for example. The entered characters including spaces may be a mixture of the full-width and half-width characters, for example.

It should be noted that the information processing apparatus referred to in the present specification include personal computers, office computers, data processors, work stations, telex machines, word processors, electronic typewriters, automatic translating apparatuses, printing apparatuses and the like. In addition, it is evident that the present invention is applicable to any information processing apparatus designed to enter characters of any form and spaces.

Further, the present invention is not limited to these embodiment, but various variations and modifications may be made without departing from the scope of the present invention.

What is claimed is:

1. A method of automatically recognizing tab position in an information processing apparatus which comprises a keyboard and a control part, said method comprising the steps of:

entering inputs through keys of the keyboard, said inputs including inputs for designating characters and spaces;
    entering a present position of a cursor;
    developing a text of a predetermined line which is the present position;
    checking tab information on said predetermined line by referring to a tab information table which contains tab information for each of digits in said predetermined line, said tab information table containing a first value for a certain digit on said predetermined line when said certain digit is a space and also when said certain digit and a digit on said predetermined line immediately preceding said digit are not spaces and containing a second value for said certain digit when said certain digit is not a space but the digit immediately preceding said certain digit is a space;
    entering one or a plurality of digit positions of digits on said predetermined line having said second value in said tab information table;
    setting said one or plurality of digit positions which are enter as one or plurality of cursor destinations on said present line; and
    automatically moving the cursor from the present position to one of the cursor destinations which is nearest to the present position on said present line along a direction in which the inputs are entered when a tab is designated from a key of the keyboard.

2. A method of automatically recognizing tab position as claimed in claim 1 in which said predetermined line immediately precedes said present line along a direction in which lines including the predetermined line and the present line are entered.

3. A method of automatically recognizing tab position as claimed in claim 1 in which said predetermined line is a nearest preceding line having said second value for at least one digit thereof in said tab information table and being nearest to said present line along a direction opposite to a direction in which lines including the predetermined line and the present line are entered.

4. A method of automatically recognizing tab position as claimed in claim 3 in which said step of checking the tab information checks tab information on each line preceding said present line until said predetermined line is reached.

5. A method of automatically recognizing tab position as claimed in claim 3 in which said step of developing the text comprises the substeps of setting a line number of said present line into a line counter, decrementing a value in the line counter by one and developing a text of a line identified by the value in the line counter, and said step of checking the tab information comprises the substep of checking tab information on each line identified by the value in the line counter until the value in the line counter identifies said nearest preceding line.

6. A method of automatically recognizing tab position as claimed in claim 1 in which said predetermined line includes all preceding lines preceding said present line and having said second value for at least one digit thereof in said tab information table.

7. A method of automatically recognizing tab position as claimed in claim 6 in which said step of developing the text comprises the substeps of setting a line number zero into a line counter and developing a text of a line identified by a value in the line counter, and said step of checking the tab information comprises the substeps of checking tab information on each line identified by the value in the line counter, writing digit positions of digits on all preceding lines having said second value into said tab information table and incrementing the value in the line counter by one, said steps of developing the text and checking the tab information being repeated until the value in the line counter becomes equal to a line number of said present line.

8. A method of automatically recognizing tab position as claimed in claim 7 in which said substep of writing the digit positions writes into said tab information table digit positions which are obtained by a logical sum of the digit positions on all preceding lines having said second value.

9. A method of automatically recognizing tab position as claimed in claim 7 which further comprises the step of initially clearing contents of said tab information table.

10. An information processing apparatus comprising:
    a keyboard provided with keys for at least designating characters and spaces;
        first means coupled to said keyboard for entering inputs through the keys of said keyboard;

second means coupled to said first means for entering a present position of a cursor;

third means coupled to said first means for developing a text of a predetermined line which is entered before a present line on which the cursor is located at the present position;

fourth means coupled to said third means for storing a tab information table, said tab information table containing a first value for a certain digit on one line when said certain digit is a space and also when said certain digit and a digit on said one line immediately preceding said digit are not spaces and containing a second value for said certain digit when said certain digit is not a space but the digit immediately preceding said certain digit is a space;

fifth means coupled to said fourth means for checking tab information on said predetermined line by referring to said tab information table which contains tab information for each of digits in said predetermined line, said predetermined line having said second value in said tab information table for at least one digit thereon;

sixth means coupled to said fifth means for entering one or a plurality of digit positions of digits on said predetermined Line having said second value in said tab information table;

seventh means coupled to said sixth means for setting said one or plurality of digit positions which are entered as one or plurality of cursor destinations on said present line; and eighth means coupled to said first and seventh means for automatically moving the cursor from the present position to one of the cursor destinations which in nearest to the present position on said present line along a direction in which the inputs are entered when a tab is designated from one of the keys of said keyboard.

11. An information processing apparatus as claimed in claim 10 in which said predetermined line immediately precedes said present line along a direction in which lines including the predetermined line and the present line are entered.

12. An information processing apparatus as claimed in claim 10 in which said predetermined line is a nearest preceding line having said second value for at least one digit thereof in said tab information table and being nearest to said present line along a direction opposite to a direction in which lines including the predetermined line and the present line are entered.

13. An information processing apparatus as claimed in claim 12 in which said fifth means checks tab information on each line preceding said present line until said predetermined line is reached.

14. An information processing apparatus as claimed in claim 12 in which said third means comprises a line counter, means for setting a line number of said present line into said line counter, means for decrementing a value in said line counter by one and means for developing a text of a line identified by the value in said line counter, and said means for checking the tab information comprises means for checking tab information on each line identified by the value in said line counter until the value in said line counter identifies said nearest preceding line.

15. An information processing apparatus as claimed in claim 10 in which said predetermined line includes all preceding lines preceding said present line and having said second value for at least one digit thereof in said tab information table.

16. An information processing apparatus as claimed in claim 15 in which said third means comprises a line counter, means for setting a line number zero into said line counter and means for developing a text of a Line identified by a value in said line counter, and said means for checking the tab information comprises means for checking tab information on each line identified by the value in said line counter, means for writing digit positions of digits on all preceding lines having said second value into said tab information table and means for incrementing the value in said line counter by one, operations of said means for developing the text and said means for checking the tab information being repeated until the value in said line counter becomes equal to a line number of said present line.

17. An information processing apparatus as claimed in claim 16 in which said means for writing the digit positions writes into said tab information table digit positions which are obtained by a logical sum of the digit positions on all preceding lines having said second value.

18. An information processing apparatus as claimed in claim 16 which further comprises means for initially clearing contents of said tab information table.

* * * * *